United States Patent
Krietzman et al.

(10) Patent No.: US 8,978,059 B2
(45) Date of Patent: Mar. 10, 2015

(54) CONNECTING MESSAGE MEDIA WITH SHARED DIGITAL MEDIA

(76) Inventors: Mark Krietzman, Palos Verdes Estates, CA (US); Damon Cusato, Los Angeles, CA (US)

( * ) Notice: Subject to any disclaimer, the term of this patent is extended or adjusted under 35 U.S.C. 154(b) by 190 days.

(21) Appl. No.: 13/136,741

(22) Filed: Aug. 9, 2011

(65) Prior Publication Data
US 2012/0124145 A1 May 17, 2012

Related U.S. Application Data

(60) Provisional application No. 61/401,229, filed on Aug. 9, 2010.

(51) Int. Cl.
| | |
|---|---|
| H04N 7/10 | (2006.01) |
| H04N 21/4402 | (2011.01) |
| G06Q 30/02 | (2012.01) |
| H04N 21/472 | (2011.01) |
| H04N 21/2343 | (2011.01) |
| H04N 21/235 | (2011.01) |
| H04N 21/435 | (2011.01) |
| H04N 21/4788 | (2011.01) |

(52) U.S. Cl.
CPC ....... *H04N 21/4402* (2013.01); *G06Q 30/0251* (2013.01); *H04N 21/47202* (2013.01); *H04N 21/2343* (2013.01); *H04N 21/235* (2013.01); *H04N 21/435* (2013.01); *H04N 21/4788* (2013.01)
USPC ................................. 725/32; 709/206; 725/63

(58) Field of Classification Search
CPC .......... H04N 7/17318; H04N 21/4788; H04N 21/6125; H04L 65/60; H04L 65/4076; A63F 13/12; G06Q 30/02
USPC ........................................................ 709/206
See application file for complete search history.

(56) References Cited

U.S. PATENT DOCUMENTS

| | | | |
|---|---|---|---|
| 8,752,100 B2 * | 6/2014 | Ramakrishnan et al. ........ 725/90 |
| 2003/0126599 A1 * | 7/2003 | Novak et al. ..................... 725/32 |
| 2008/0066107 A1 * | 3/2008 | Moonka et al. ................... 725/42 |
| 2009/0113472 A1 * | 4/2009 | Sheth et al. ....................... 725/34 |
| 2009/0328122 A1 * | 12/2009 | Amento et al. ................. 725/114 |
| 2011/0274409 A1 * | 11/2011 | Zalewski ....................... 386/248 |
| 2012/0028712 A1 * | 2/2012 | Zuili .............................. 463/39 |

* cited by examiner

*Primary Examiner* — Michael Pyzocha
*Assistant Examiner* — Gregory M Elmore
(74) *Attorney, Agent, or Firm* — Apogee Law Group

(57) ABSTRACT

A digital media sharing system ("DMSS") for creating, transmitting and receiving digital media data ("DMD") with message media (MM) files attached thereto. Said message Media may reside locally or on a server prior to being connected to said digital media data.

16 Claims, 19 Drawing Sheets

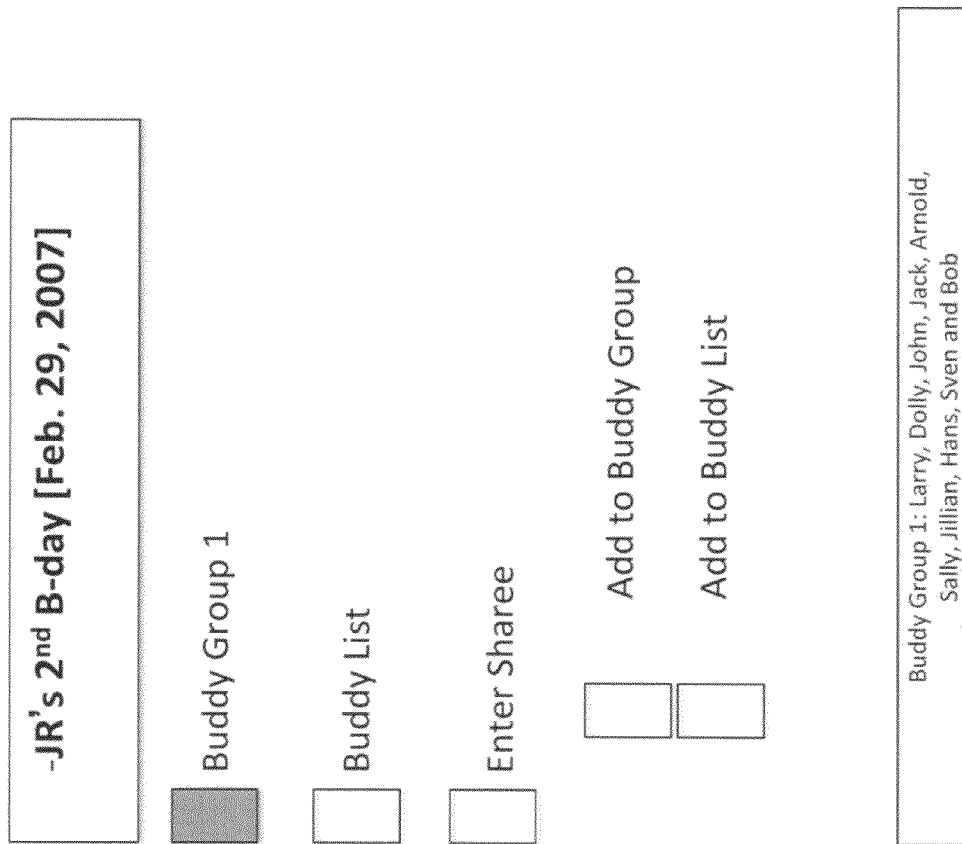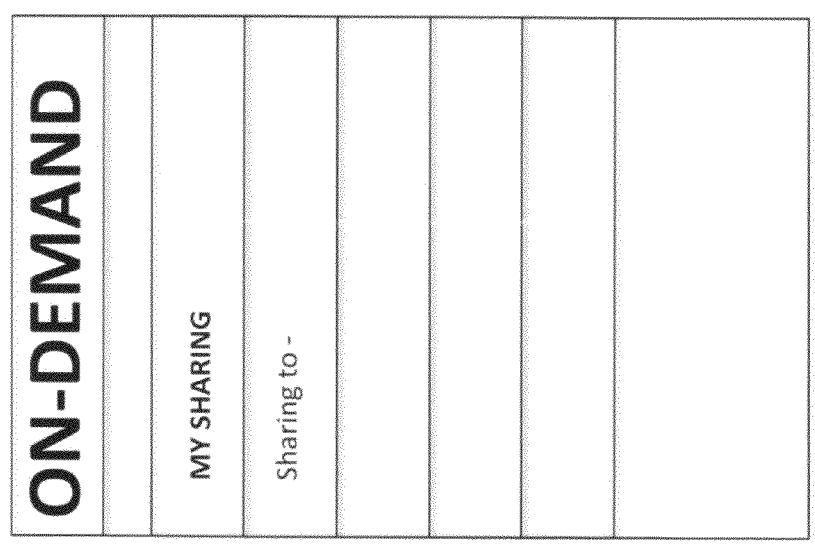
Figure 12

Sharing from remote archive via GUI

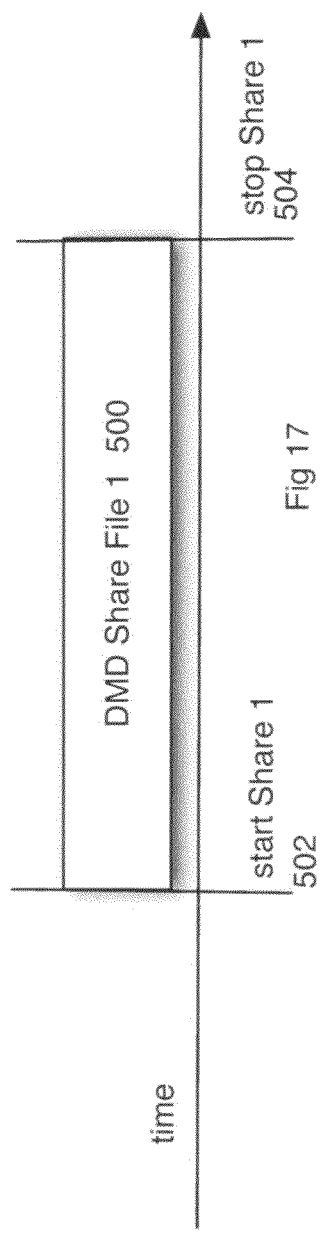
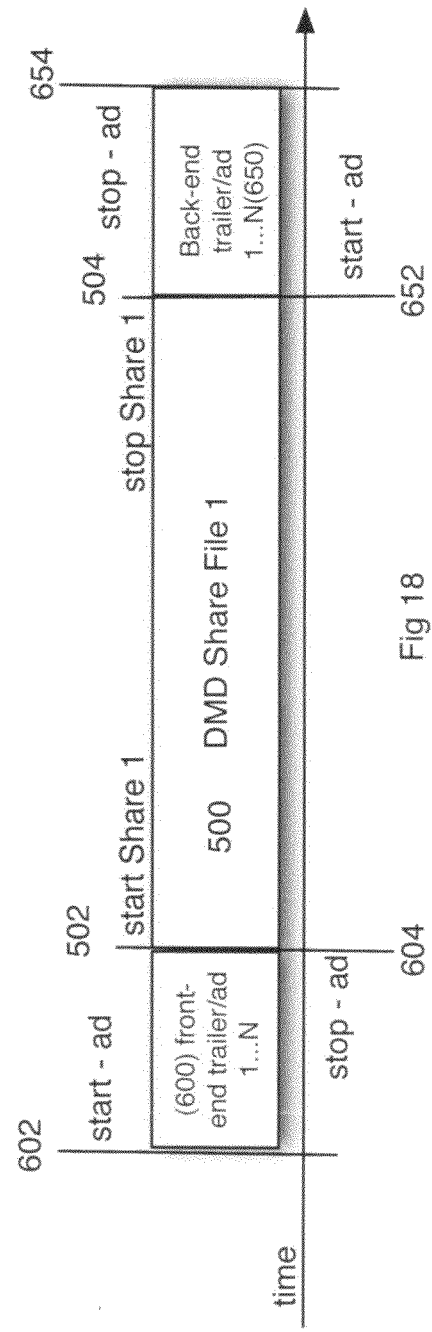

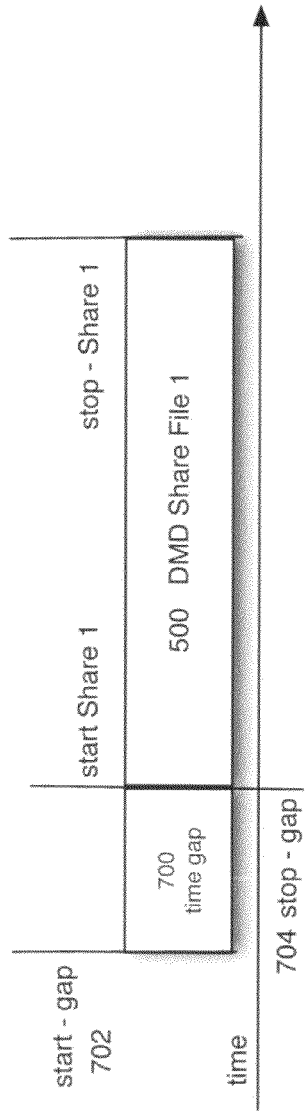
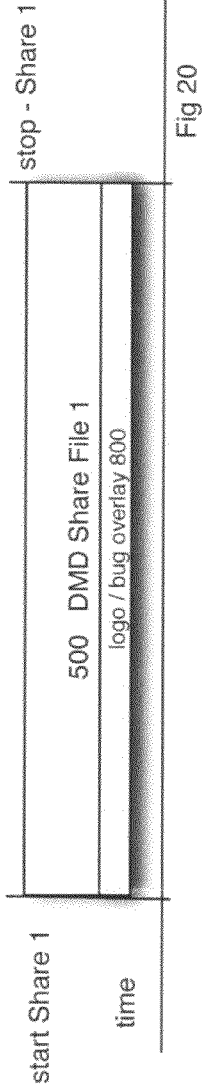
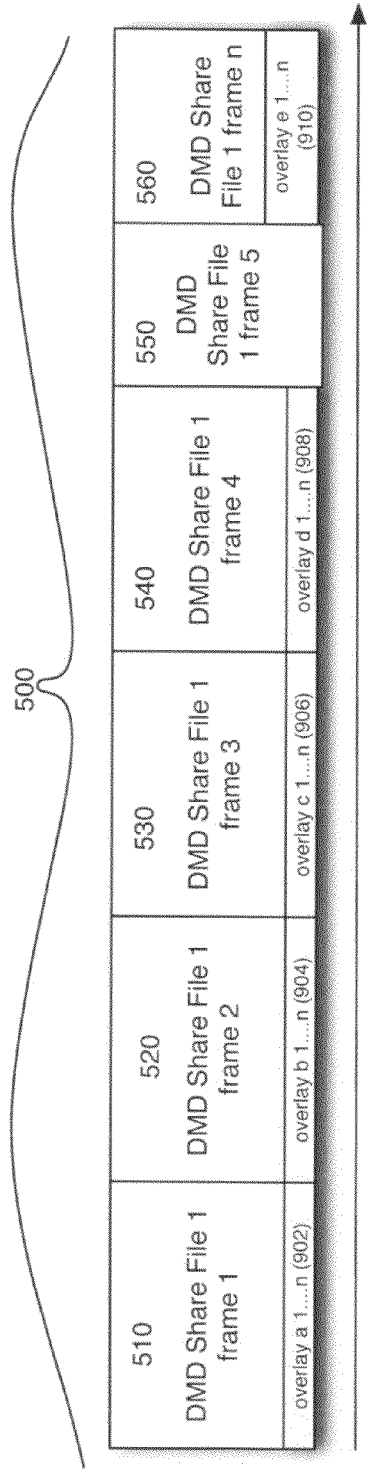

US 8,978,059 B2

CONNECTING MESSAGE MEDIA WITH SHARED DIGITAL MEDIA

1. PRIORITY

This application claims the benefit of U.S. provisional patent application 61/401,229 filed Aug. 9, 2010 entitled "ADDING MESSAGE CONTENT TO SHARED DIGITAL MEDIA" the entirety of which (specification, claims, figures, appendices and abstract) is hereby incorporated by this reference as if fully set forth herein.

FIELD

This disclosure relates generally to targeted advertising and in particular to a method and system for adding message media to digital media that is shared.

BACKGROUND

At present, the growth of telecommunication networks has allowed a growing number of people to communicate with each other in many different ways. These telecommunication networks have allowed people to communicate in ways that vary from voice telephony to data and media sharing. Global communication networks such as the Internet have produced communication options such as email, file transfer protocol ("ftp"), personal websites, online forums, chat services, peer-to-peer services, instant messenger services (such as messenger services provided by Yahoo! Inc. of Sunnyvale, Calif., Microsoft Corporation of Redmond, Wash., Google Inc. of Mountain View, Calif., etc.), streaming media services (such as YOUTUBE®), voice-over IP ("VoIP")(such as SKYPE®, Vonage Holding Corp. of Holmdel, N.J., etc), Internet video conferencing, social networking services (such as Twitter Inc. of San Francisco, Calif., Linkedin Corporation of Mountain View, Calif., Facebook Inc. of Menlo Park, Calif., etc.), etc.

Other telecommunication networks such as some of the cellular telecommunication networks have also increased the ways that their users can communicate with each other (such as text messaging, media sharing services, etc.) and with external communication networks such as the Internet. As a result, at present, the sharing of digital media has become a growing cultural trend both on the Internet and cellular telephone networks.

Advertising and/or branding is constantly seeking new ways to place messages in front of the population of targeted potential consumers which are within selected demographics. Youtube® for example streams google links with playback online of some files.

As such, there is a need for a system and method for connecting message media with shared digital media content through a communication infrastructure that is secure and does not have any of the drawbacks of the prior art services.

DESCRIPTION

A digital media sharing system ("DMSS") for receiving digital media data ("DMD") produced by a media device is described. The DMSS may include a network, a first set-top box in signal communication with the network, a first rendering device in signal communication with the set-top box and the network, and a storage device in signal communication with the set-top box and the network. The first set-top box may be configured to receive the DMD from the media device and the rendering device may be configured to render the received DMD. The storage device may be configured to store the rendered DMD.

In some exemplary implementations, and one or more aspects associated therewith, set forth is a DMSS for receiving digital media data produced by a media device, the DMSS including a network; a first set-top box in signal communication with the network, wherein the first set-top box is configured to receive the digital media data from the media device; a first rendering device in signal communication with the set-top box and the network, wherein the rendering device is configured to render the received digital media data; a storage device in signal communication with the set-top box and the network, wherein the storage device is configured to store the rendered digital media data; and the network is a cable communication network that is in signal communication with a plurality of set-top boxes.

In some exemplary implementations, and one or more aspects associated therewith, an ad-on message file such as a video trailer, advertisement, logo, brand or bug is affixed and incorporated into the uploaded DMD file. The addition of a specific message file may correlate to paid advertisement/placement.

In some exemplary implementations, and one or more aspects associated therewith, an ad-on message file such as a video trailer, advertisement, logo, brand or bug is affixed and incorporated into the DMD file during rendering and/or preparation for sharing. The addition of a specific message file may correlate to paid advertisement/placement.

In some exemplary implementations, and one or more aspects associated therewith, an ad-on message file such as a audio file, video trailer, advertisement, logo, brand or bug is affixed and incorporated into the DMD file on the share side of the share. The addition of a specific message file may correlate to paid advertisement/placement.

In some exemplary implementations, and one or more aspects associated therewith, an ad-on message file such as a video trailer, advertisement, logo, brand or bug is affixed and incorporated into the DMD file on the sharer side of the share. The addition of a specific message file may correlate to paid advertisement/placement.

In some exemplary implementations, and one or more aspects associated therewith, is set forth a DMSS for receiving digital media data produced by a media device, the DMSS including a network; a first set-top box in signal communication with the network, wherein the first set-top box is configured to receive the digital media data from the media device; a first rendering device in signal communication with the set-top box and the network, wherein the rendering device is configured to render the received digital media data; a storage device in signal communication with the set-top box and the network, wherein the storage device is configured to store the rendered digital media data; the network is a cable communication network that is in signal communication with a plurality of set-top boxes; and there is at least one server in signal communication with the cable communication network and wherein the first rendering device is external to the first set-top box and is in signal communication with the server. In some implementations the storage device is external to the first set-top box and is in signal communication with the server. In some implementations there is a second set-top box of the plurality of set-top boxes, wherein the second set-top box is configured to receive the rendered digital media data from the storage device. In some implementations a second rendering device located within a second set-top box of the plurality of set-top boxes. In some aspects the storage device is external to the first set-top box and is in signal communication with the server. In some implementations the second set-top box is configured to receive the rendered digital media data from the storage device. In some implementations a third set-top box of the plurality of set-top boxes, wherein the third set-top box is in signal communication with the network, and wherein the third set-top box is configured to receive the rendered digital media data from the storage device.

In some exemplary implementations, and one or more aspects associated therewith, set forth is a method for sharing digital media data produced by a media device over a network having a plurality of set-top boxes, the method including; receiving the digital media data at a first set-top box of the plurality of set-top boxes; rendering the received digital media data; storing the rendered digital media data on a storage device; and, the network is a cable communication network that is in signal communication with the plurality of set-top boxes. In some implementations storing includes storing the rendered digital media data on a storage device located within the first set-top box and rendering includes rendering the received digital media data in a file format that is usable by the storage device. In some implementations an accessible menu that is displayed on a display in signal communication with the first set-top box is produced, wherein the accessible menu displays a confirmation of the storage of the rendered digital media data. In some implementations the server is queried for at least one file format usable by the targeted storage device.

In some implementations receiving the rendered digital media data from the storage device is at least one second set-top box from the plurality of set-top boxes. In some implementations rendering the received digital media data is within at least one of the first set-top box and a second set-top box of the plurality of set-top boxes.

Other devices, apparatus, systems, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

FIGURES

The disclosure may be better understood by referring to the following figures. The components in the figures are not necessarily to scale, emphasis instead being placed upon illustrating the principles of the disclosure. In the figures, like reference numerals designate corresponding parts throughout the different views. All callouts in any appendices and/or figures are hereby incorporated by this reference.

FIGS. 5 through 16 show examples of screen shots of a Graphic user interface to some aspects of the disclosure.

FIG. 17 represents a DMD file without additive trailer/ad.

FIG. 18 represents a DMD file with additive trailer/ad.

FIG. 19 represents a DMD file with a time gap designated to fill with a local additive trailer/ad.

FIG. 20-22 represents a DMD file with overlay or additive bug, logo ad and the like.

All descriptions and callouts in the Figures are hereby incorporated by this reference as if fully set forth herein.

FURTHER DESCRIPTION

In the following description of examples of implementations, reference is made to the accompanying drawings that form a part hereof, and which show, by way of illustration, specific implementations of the present disclosure that may be utilized. Other implementations may be utilized and structural changes may be made without departing from the scope of the present disclosure.

In general, a digital media sharing system ("DMSS") for receiving digital media data produced by a media device is disclosed. The DMSS may share the digital media data ("DMD") with a number of users and/or store the DMD in varying types of storage devices. In general, the DMSS may include a network, a first set-top box ("STB"), a first rendering device, and a storage device. The first STB may be in signal communication with the network. The first rendering device may be in signal communication with the STB and the network. The storage device may also be in signal communication with the STB and the network. The first STB is configured to receive the DMD from the media device and the rendering device is configured to render the received DMD. The storage device is configured to store the rendered DMD. Moreover, in addition to the first STB, the DMSS may also include other STBs in signal communication with the network. As an example of operation, the DMSS may perform a method that includes receiving the DMD at the first STB of the plurality of STBs, rendering the received DMD, and then storing the rendered DMD on a storage device.

Figure 1:
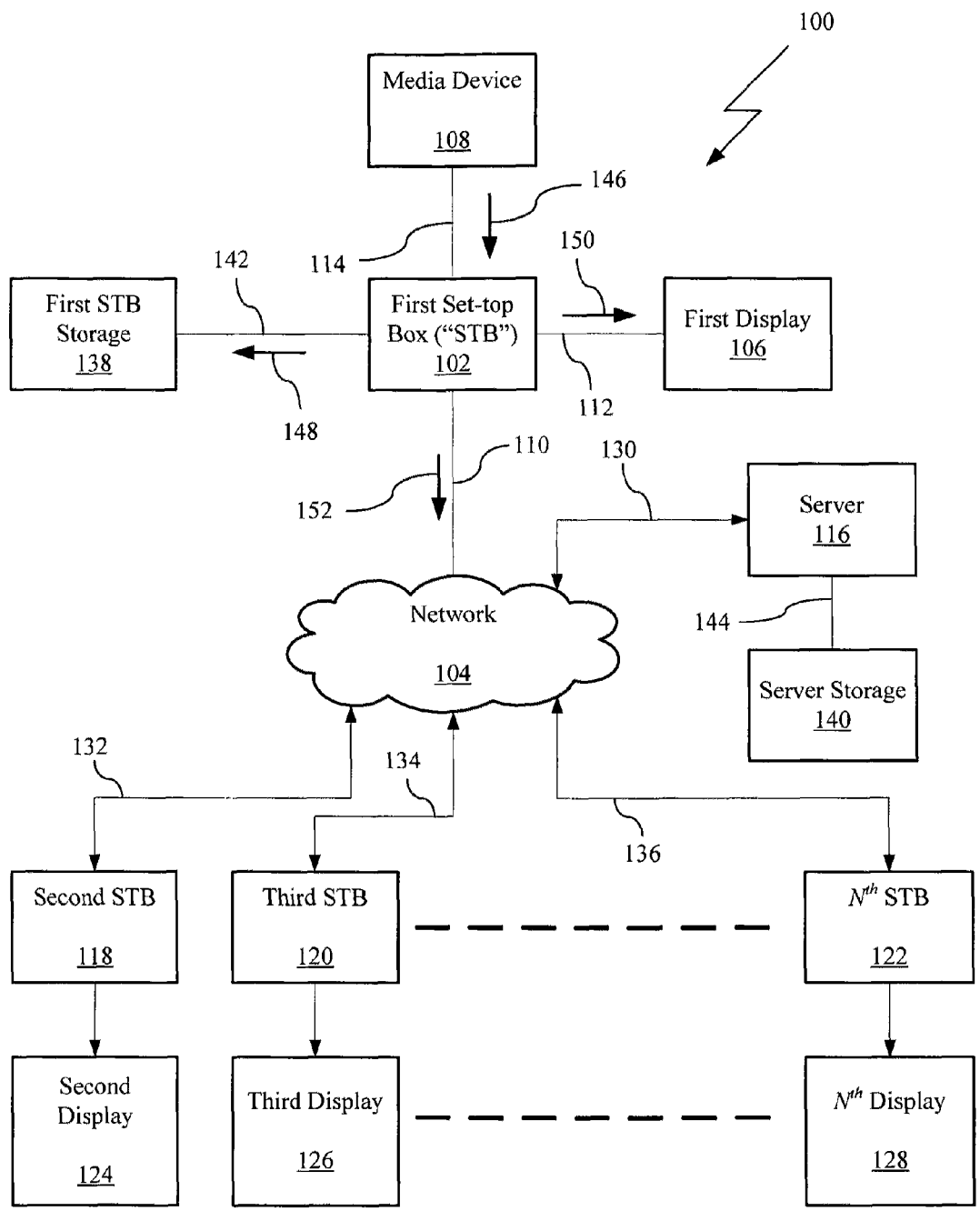
FIG. 1 is a system block diagram of an example of an implementation of digital media sharing system ("DMSS") for receiving digital media data produced by a media device, in accordance with the disclosure.

Turning to FIG. 1, a system block diagram is shown of an example of an implementation of DMSS 100 in accordance with the disclosure. The DMSS 100 may include a first STB 102 in signal communication with a network 104, display 106, and media device 108 via signal paths 110, 112, and 114, respectively. The DMSS 100 may also include a server 116, a second STB 118, second display 120, a third STB 122, third display 124, an $N^{th}$ STB 126, and an $N^{th}$ display 128. The network 104 may be in signal communication with the server 116, second STB 118, third STB 122, and the $N^{th}$ STB 126 via signal paths 130, 132, 134, and 136, respectively. The first STB 102 may also be in signal communication with a first STB storage 138 and the server may be in signal communication with a server storage 140 via signal paths 142 and 144, respectively. Similarly each STB from the second STB 118 to the $N^{th}$ STB 122 may also have an associated STB storage (not shown) in signal path with each corresponding STB.

It is appreciated by those skilled in the art that the circuits, components, modules, and/or devices of the DMSS 100 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical such as, for example, conductive wires, electromagnetic waveguides, attached and/or electromagnetic or mechanically coupled, terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

As an example, the first STB 102, second STB 118, third STB 120, and N$^{th}$ STB 122 may all be typical STBs utilized either by a cable television provider ("CTP") such as, for example, Cox Communication Inc. of Atlanta, Ga., Time Warner Cable Inc. of New York City, New York, Comcast Corporation of Philadelphia, Pa., etc., a satellite television provider ("STP") such as, for example, DISH Network®, DIRECTV®, etc., or other type of network television provider (such as television visa DSL) that requires that end user use an STB to receive television content (analog, digital, or both) from a proprietary communication network that can be displayed on a display in signal communication with the STB. In the example of a CTP, the STB is generally known as a "cable box." The STB may be any device capable of receiving television programming with one or more video tuners and processor(s) and a device address. STB's also include gaming systems, gaming units like PLAYSTATION® (produced by Sony Corporation of Tokyo, Japan), WII® (produced by Nintendo Co., Ltd. of Kyoto, Japan), XBOX® (produced by Microsoft Corporation), APPLE TV® (produced by Apple Inc. of Cupertino, Calif.), DVR, or the like. Typically, STBs include storage capacity (such as first STB storage 138) for storing shared DMD and/or for buffering shared DMD. Generally, STBs are devices that have assigned MAC addresses, IP addresses, access IDs, and serial numbers that are specific to the STB and are a form of identity information to the CTP or STP.

The media device 108 is a detachable device that may be any type of video device including, for example, a video camera (such as an analog or digital camcorder), digital camera with video capability, a video enable cellular telephone, etc.

Each transforming of DMD from one device or form to another device or form is an opportunity for the CTP or STP to form a new revenue stream either through a per event charge or recurring charge for access to the portions of the hardware and software within the CTP or STP infrastructure. Media device(s) 108 well suited to mate, merge or connect or otherwise interface with said CTP or STP for optimal rendering and/or transfer provide additional opportunity for said CTP or STP to derive revenue streams from per use, recurring, sales, leasing or rental.

The network 104 may be any proprietary communication network such as for example, a CTP network and/or STP network. The network 104 may include access to travel through non-proprietary communication networks such as the Internet or cellular telephone networks.

The first display 106, second display 124, third display 126, and N$^{th}$ display 128 may be any generally know video display that is capable of display visual programming and information produced by the corresponding STB 102, 118, 120, and 122, respectively. Examples of these types of video displays include analog and/or digital televisions, display monitors, computer monitors, etc.

The server 116 may be any server or combination of servers utilized by the CTP or STP for accessing and/or controlling the network 104. In the case of a CTP and/or STP, the server 116 may include the communication and processing equipment utilized by the CTP and/or STP to generate, control, and/or save DMD on the DMSS 100. Said server or any portion thereof may be targeted for use for a particular storage task.

The first STB storage 138, server storage 140, and other storage devices (not shown) corresponding to the other STBs 118, 120, and 122, may be memory devices capable of storing DMD. The STB storage 138 (and the storage of the other STBs 118, 120, and 122) may be memory devices that may be either internal to the first STB 102 and other corresponding STBs 118, 120, and 122, or external based on the preference of the user of the corresponding STB and the capabilities offered by the respective CTP and/or STP. Examples of the these types of storage may include, for example, computer hard-drives and/or RAM memory. In the case of the first STB storage 138, it may be a hard-drive located internal to the first STB 102 or it could optionally be an external storage unit such as an external hard-drive. In the case of the server 116, the server storage 140 may also be an internal hard-drive to the server 116, external hard-drive, or it could be one or more storage servers (not shown) that include multiple hard-drives each.

The first STB 102, second STB 118, third STB 120, N$^{th}$ STB 122, and server 116 may each have processor (not shown) capable of processing (such, as for example, capturing, converting, and/or rendering) of receiving video data from the media device 108 and converting it to DMD and/or converting the DMD into another format for video processing or optimized for storage on the first STB storage 138, server storage 140, other storage devices, or combination of storage devices. The processor may act as a rendering device that is configured to render any received video from the media device 108 to produce the DMD. The processor may also act a parallel processing rendering device wherein a processor for a given device (such as the first STB 102) may act in parallel with the processor (not shown) of the server 116 and/or other processors (not shown) of the other STBs 118, 120, and 122 to render the video or DMD quicker than would be possible by just one single processor. The processor may be any general purpose processor such as for example an central processor unit ("CPU"), an application specific integrated chip ("ASIC"), digital signal processor ("DSP"), reduced instruction set ("RISC") processor, microprocessor, or other similar devices.

As an example of operation, the DMSS 100 may perform a method that includes receiving the DMD at the first STB 102 of the plurality of STBs, rendering the received DMD, and then storing the rendered DMD on a storage device. The storage device may be the first STB storage 138, server storage 140, a storage device corresponding to the other STBs, or a combination of these.

More specifically, if a user captures video with the media device 108 (such as, for example, recording video with a video camera) and then connects the media device 108 to the first STB 102 via the signal path 114 (which may be via a universal serial bus ("USB"), HDMI, Firewire®, eSATA, IEEE 802.11, Bluetooth®, Ethernet, LAN, white space device, or other type of wired or wireless connection), the user can upload his/her recorded video to the first STB 102. The recorded video uploaded via an input video signal 146 that may be analog or digital based on the type of device utilized as the media device 108. The input video signal 146 is received by the first STB 102 which may process the input video signal 146 to produce a DMD signal which may be sent 148 along signal path 142 to be stored in the first STB storage 138 and/or sent 150 along signal path 112 to be displayed on the first display 106. Alternatively, the DMD may be sent 152 from the first STB 102 along signal path 110 through the network 104 to either the server 116, one of more STBs (such as 118, 120, and 122), or combination of either server 116 and STBs or multiple STBs based on the utilization of the other processors in the server 116 or other STBs 118, 120, and 122.

In general, the first STB 102 includes software with drivers which are capable of auto-detecting the type of device that the media device 108 is when it is connected to the first STB 102. The STB 102 may include a driver database with different drivers corresponding to different media devices. Once the proper driver is installed in the first STB 102, the first STB 102 is able to copy or capture video 146 received from the media device 108. The first STB 102 is then configured to encode the video 146 in real-time utilizing a tuner or other video specific device such as video encoder, processor or chip designed for video capture. It is appreciated that the encoding can be shared between the first STB 102, the other STBs 118, 120, and 122 and/or the server 116 based on usage of the different processors in the different devices. Once the encoding have been completed, the first STB 108 is configured to store the DMD on the first STB storage 138 and/or remote storage such as server storage 140 and/or other storage devices on the other STBs 118, 120, and 122. To connect to a remote storage, the first STB 108 may utilize network security credential such as, for example, peer name, password and MAC address to authentic peer.

Figure 2:
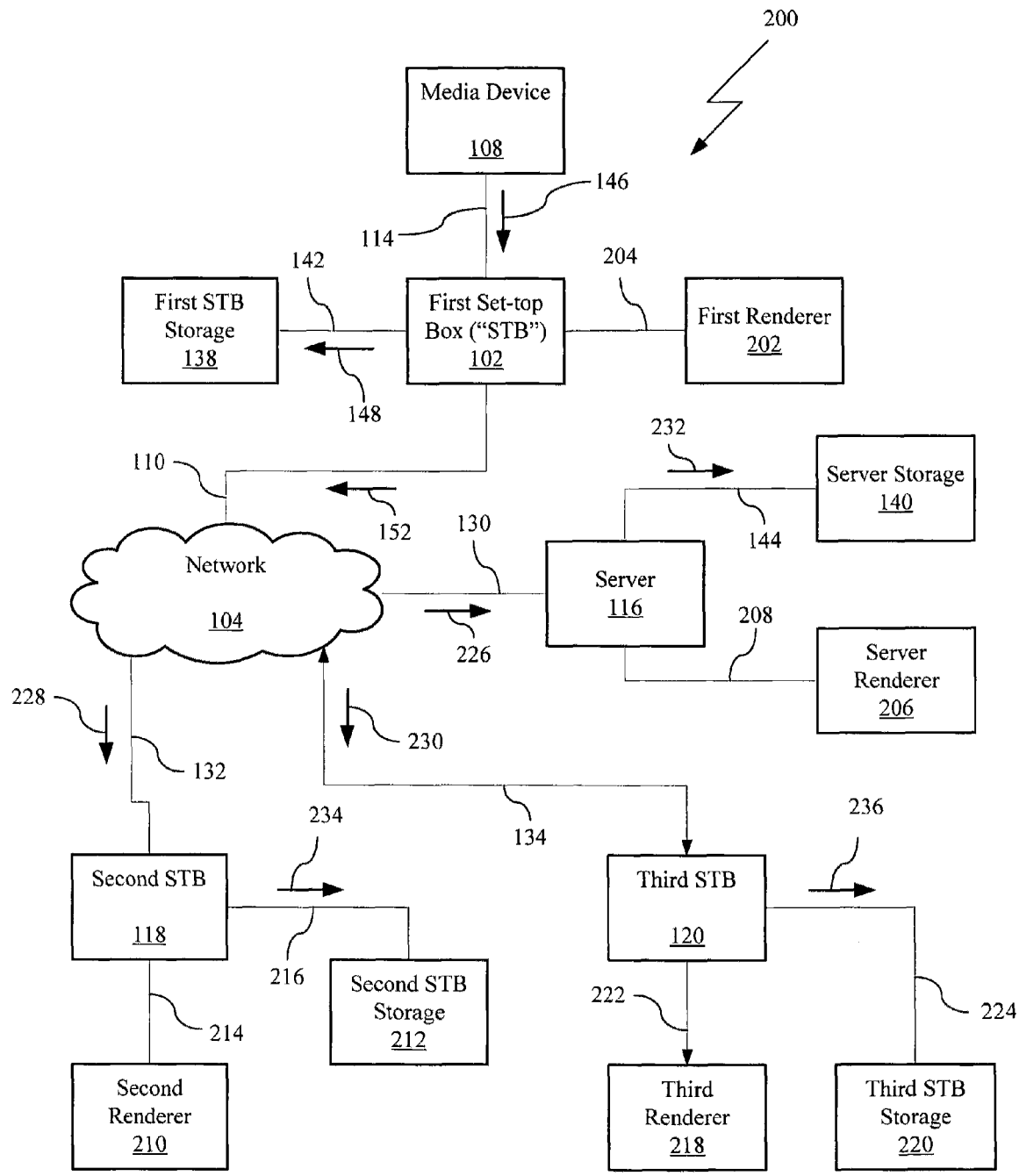
FIG. 2 is a block diagram of an example of an implementation of utilizing the DMSS of FIG. 1 for capturing and rendering recorded video produced a the media device.

In FIG. 2, a block diagram is shown of an example of an implementation of utilizing the DMSS 200 for capturing and rendering recorded video 146 produced by the media device 108. In this example, the first STB 102 may include a first renderer 202 that is in signal communication with the first STB 102 via signal path 204. The first renderer 202 may be module, circuit, component, and/or device located internal to the first STB 102 or may be an external device. The server 116 may also include a server renderer 206 in signal communication with the server 116 via signal path 208. Similar to the first renderer 202, the server renderer 206 may be module, circuit, component, and/or device located internal to the server 116 or may be an external device. The second STB 118 may include a second renderer 206 and a second STB storage 212 in signal communication with the second STB 118 via signal paths 214 and 216, respectively. Similar to the first renderer 202, the second renderer 206 may be module, circuit, component, and/or device located internal to the second STB 118 or may be an external device. Similar to first STB storage 138, the second STB storage 118 may be a memory device capable of storing the DMD. The second STB 118 may be a memory device that may be either internal to the second STB storage 118 or external based on the preference of the user of the second STB storage 118 and the capabilities offered by the respective CTP and/or STP. Examples of the second STB storage 118 may include, for example, computer hard-drives and/or RAM memory, which may be a hard-drive located internal to the second STB storage 118 or it could optionally be an external storage unit such as an external hard-drive.

Similar to the second STB 118, the third STB 120 may include a third renderer 218 and a third STB storage 220 in signal communication with the third STB 120 via signal paths 222 and 224, respectively. Similar to the first renderer 202, the third renderer 218 may be module, circuit, component, and/or device located internal to the third STB 120 or may be an external device. Similar to first STB storage 138, the third STB 120 may be a memory device capable of storing the DMD. The third STB 120 may be a memory device that may be either internal to the third STB 120 or external based on the preference of the user of the third STB 120 and the capabilities offered by the respective CTP and/or STP. Examples of the third STB 120 may include, for example, computer hard-drives and/or RAM memory, which may be a hard-drive located internal to the third STB 120 or it could optionally be an external storage unit such as an external hard-drive.

In an example of operation, a user of the first STB 102 may detachably connect a media device 108 (such as a camcorder, digital camera with video capability, cellular telephone with video capability, etc.) with recorder video to the first STB 102. As stated earlier, once connected the media device 108 may be in signal communication with the first STB 102 via the detachable connected signal path 114, which may be via a USB, HDMI, Firewire®, eSATA, IEEE 802.11, Bluetooth®, Ethernet, LAN, white space device, or other type of wired or wireless connection. The user of the first STB 102 can then upload his/her recorded video to the first STB 102 from the media device 108 via the input video signal 146, which may be an analog or digital video signal based on the type of device utilized as the media device 108. The input video signal 146 is received by the first STB 102 which may process the input video signal 146 to produce a DMD signal which may be sent 148 along signal path 142 to the first STB storage 138 for storage at the first STB 102 and/or sent 152 and 226 from the first STB 102 along signal path 110 through the network 104 and signal path 130 to the server 116. Alternatively, the DMD signal may be sent 152 and 228 from the first STB 102 along signal path 110 through the network 104 and signal path 132 to the second STB 118; or the DMD signal may be sent 152 and 230 from the first STB 102 along signal path 110 through the network 104 and signal path 134 to the third STB 120. The chosen path for the DMD signal may determined by a controller (not shown) in either the first STB 102 or server 116 based on system resources of the DMSS 100. The controller may be a microprocessor, microcontroller, processor, DSP, ASIC, RISC processor, or other type of similar processor. The controller may be part of or in signal communication with a processor (not shown) located at either first STB 102 or server 116.

Storage of Digital Media Data within the Network

Based on the system resources of the DMSS 100, if the controller determines that the DMD signal is to be processed exclusively within the first STB 102, the first STB 102 receives the input video signal 146 from the media device 108 and processes it via the first renderer 202. The first renderer 202 may first capture and convert the input video signal 146 from an analog video signal to a digital video signal based on whether the media device 108 is an analog video device. If the media device 108 is a digital device, then the first renderer 202 does not have to capture and convert the input video signal 146 except for possibly converting the input video signal 146 from the digital format utilized by the media device 108 to another digital format more suitable for processing and storing by the first STB 102. The digital video signal may then be rendered by the first renderer 202 to produce the DMD signal 148 which may be passed to the first STB storage 138 via signal path 142. In this manner the first STB storage 138 may act as a local archive for DMD that is uploaded by the user utilizing the media device 108.

If the controller determines, based on the system resources of the DMSS 100, that the DMD signal is to processed by the first STB 102 but stored on the server storage 140, the first STB 102 receives the input video signal 146 from the media device 108 and processes it via the first renderer 202. The first renderer 202 may first capture and convert the input video signal 146 from an analog video signal to a digital video signal based on whether the media device 108 is an analog video device. Again, if the media device 108 is a digital device, then the first renderer 202 does not have to capture and convert the input video signal 146 except for possibly converting the input video signal 146 from the digital format utilized by the media device 108 to another digital format more suitable for processing and storing by the first STB 102 and/or server 116. The digital video signal may then be rendered by the first renderer 202 to produce the DMD signal 152, 226, and 232 which may be passed to the server storage 140 via signal paths 110, 130, and 144, network 104, and server 116. In this manner the server storage 140 may act as a remote archive for the DMD that is uploaded by the user utilizing the media device 108. If a specific remote archive provider of archive server is particularly identified for an archive task that server may be referred to as targeted.

If the controller determines, based on the system resources of the DMSS 100, that the DMD signal is to processed by the first STB 102 but stored on the second STB storage 212, the first STB 102 receives the input video signal 146 from the media device 108 and processes it via the first renderer 202. The first renderer 202 may first capture and convert the input video signal 146 from an analog video signal to a digital video signal based on whether the media device 108 is an analog video device. Again, if the media device 108 is a digital device, then the first renderer 202 does not have to capture and convert the input video signal 146 except for possibly converting the input video signal 146 from the digital format utilized by the media device 108 to another digital format more suitable for processing and storing by the first STB 102 and/or second STB 118. The digital video signal may then be rendered by the first renderer 202 to produce the DMD signal 152, 228, and 234 which may be passed to the second STB storage 212 via signal paths 110, 132, and 216, network 104, and second STB 118. In this manner the second STB storage 212 may act as a remote archive for the DMD that is uploaded by the user utilizing the media device 108.

Similarly, if the controller determines, based on the system resources of the DMSS 100, that the DMD signal is to processed by the first STB 102 but stored on the third STB storage 220, the first STB 102 receives the input video signal 146 from the media device 108 and processes it via the first renderer 202. The first renderer 202 may first capture and convert the input video signal 146 from an analog video signal to a digital video signal based on whether the media device 108 is an analog video device. Again, if the media device 108 is a digital device, then the first renderer 202 does not have to capture and convert the input video signal 146 except for possibly converting the input video signal 146 from the digital format utilized by the media device 108 to another digital format more suitable for processing and storing by the first STB 102 and/or third STB storage 220. The digital video signal may then be rendered by the first renderer 202 to produce the DMD signal 152, 230, and 236 which may be passed to the third STB storage 220 via signal paths 110, 134, and 224, network 104, and third STB 120. In this manner the third STB 120 may act as a remote archive for the DMD that is uploaded by the user utilizing the media device 108.

Rendering Digital Media Data within the Network

Rendering at the Server Renderer

Based on the system resources of the DMSS 100, if the controller determines that the DMD signal is to be processed external to the first STB 102 at the server renderer 206, the first STB 102 receives the input video signal 146 from the media device 108 and processes it via the first renderer 202. The first renderer 202 may first capture and convert the input video signal 146 from an analog video signal to a digital video signal based on whether the media device 108 is an analog video device. If the media device 108 is a digital device, then the first renderer 202 does not have to capture and convert the input video signal 146 except for possibly converting the input video signal 146 from the digital format utilized by the media device 108 to another digital format more suitable for processing by the server renderer 206. The first STB 102 then sends the digital video signal to the server renderer 206 via signal paths 110, 130, and 208 and through the network 104 and server 116. The digital video signal may then be rendered by the server renderer 206 to produce the DMD signal 232 which may be passed to the server storage 140 via signal path 144 or back to the first STB 102 and stored via the first STB storage 138. In this manner the server renderer 206 acts as a remote processor capable of processing the digital video signal with processing power that is typically greater than that of the processor of the first renderer 202. In this example, the first STB storage 138 may act as a local archive for DMD that is processed by the server renderer 206 or the server storage 140 may act as a remote archive for DMD that is processed by the server renderer 206.

Rendering at the Second STB

If, instead, the controller determines that the DMD signal is to be processed external to the first STB 102 at the second STB renderer 212, the first STB 102 receives the input video signal 146 from the media device 108 and processes it via the first renderer 202. The first renderer 202 may first capture and convert the input video signal 146 from an analog video signal to a digital video signal based on whether the media device 108 is an analog video device. If the media device 108 is a digital device, then the first renderer 202 does not have to capture and convert the input video signal 146 except for possibly converting the input video signal 146 from the digital format utilized by the media device 108 to another digital format more suitable for processing by the server renderer 206. The first STB 102 then sends the digital video signal to the second STB renderer 212 via signal paths 110, 132, and 216 and through the network 104 and second STB 118. The digital video signal may then be rendered by the second STB renderer 212 to produce the DMD signal 234 which may be passed to the second STB storage 212 via signal path 216 or back to the first STB 102 and stored via the first STB storage 138. Similarly to the previous example, in this manner the second STB renderer 212 acts as a remote processor capable of processing the digital video signal. In this example, the first STB storage 138 may act as a local archive for DMD that is processed by the second STB renderer 212 or the second STB storage 212 may act as a remote archive for DMD that is processed by the second STB renderer 212.

Rendering in Parallel Utilizing Multiple Renderers on the Network

Alternatively, if the controller determines that the DMD signal is to be processed in parallel utilizing the first renderer 202 and one or more external renderers, the first STB 102 receives the input video signal 146 from the media device 108 and processes it via the first renderer 202. The first renderer 202 may first capture and convert the input video signal 146 from an analog video signal to a digital video signal based on whether the media device 108 is an analog video device. If the media device 108 is a digital device, then the first renderer 202 does not have to capture and convert the input video signal 146 except for possibly converting the input video signal 146 from the digital format utilized by the media device 108 to another digital format more suitable for processing by the plurality of renderers. Part of the digital video signal may then be rendered by the first renderer 202 to produce part of the DMD signal which may be passed to the first STB storage 138 via signal path 142. In this manner the first STB storage 138 may act as a local archive for DMD that is uploaded by the user utilizing the media device 108.

Another part of the digital video signal may then be rendered by the second renderer 210 to produce another part of DMD signal which may be passed to the first STB storage 138 via signal paths 214, 132, 110, and 142 and through the second STB 118, network 104 and first STB 102. This second part of the DMD signal may be combined with the first part of the DMD signal to make the combined DMD signal 148. Moreover, another part of the digital video signal may then be rendered by the third renderer 218 to produce yet another part of DMD signal which may be passed to the first STB storage 138 via signal paths 222, 134, 110, and 142 and through the third STB 120, network 104 and first STB 102. This third part of the DMD signal may also be combined with the first and second parts of the DMD signal to make the combined DMD signal 148.

Additionally, another part of the digital video signal may then be rendered by the server renderer 206 to produce yet another part of DMD signal which may be passed to the first STB storage 138 via signal paths 208, 130, 110, and 142 and through the server 116, network 104 and first STB 102. This fourth part of the DMD signal may also be combined with the first, second and thirds parts of the DMD signal to make the combined DMD signal 148. Further still, another part of the digital video signal may then be rendered by a plurality of renderers at different corresponding STBs to produce more parts of DMD signal which may be passed to the first STB storage 138. These plurality of parts of the DMD signal may also be combined with the first and second parts of the DMD signal to make the combined DMD signal 148.

It is appreciated by those skilled in the art that number of external renderers utilized is based on the system resources of the DMSS 100 and available bandwidth of these renderers. It is also appreciated that while the server renderer 206 is potentially the most powerful renderer (or renderers based on the number of servers on the network), it may still be beneficial to utilize the renderers in a plurality of STBs in order to speed up any rendering tasks using known parallelization techniques.

Figure 3:
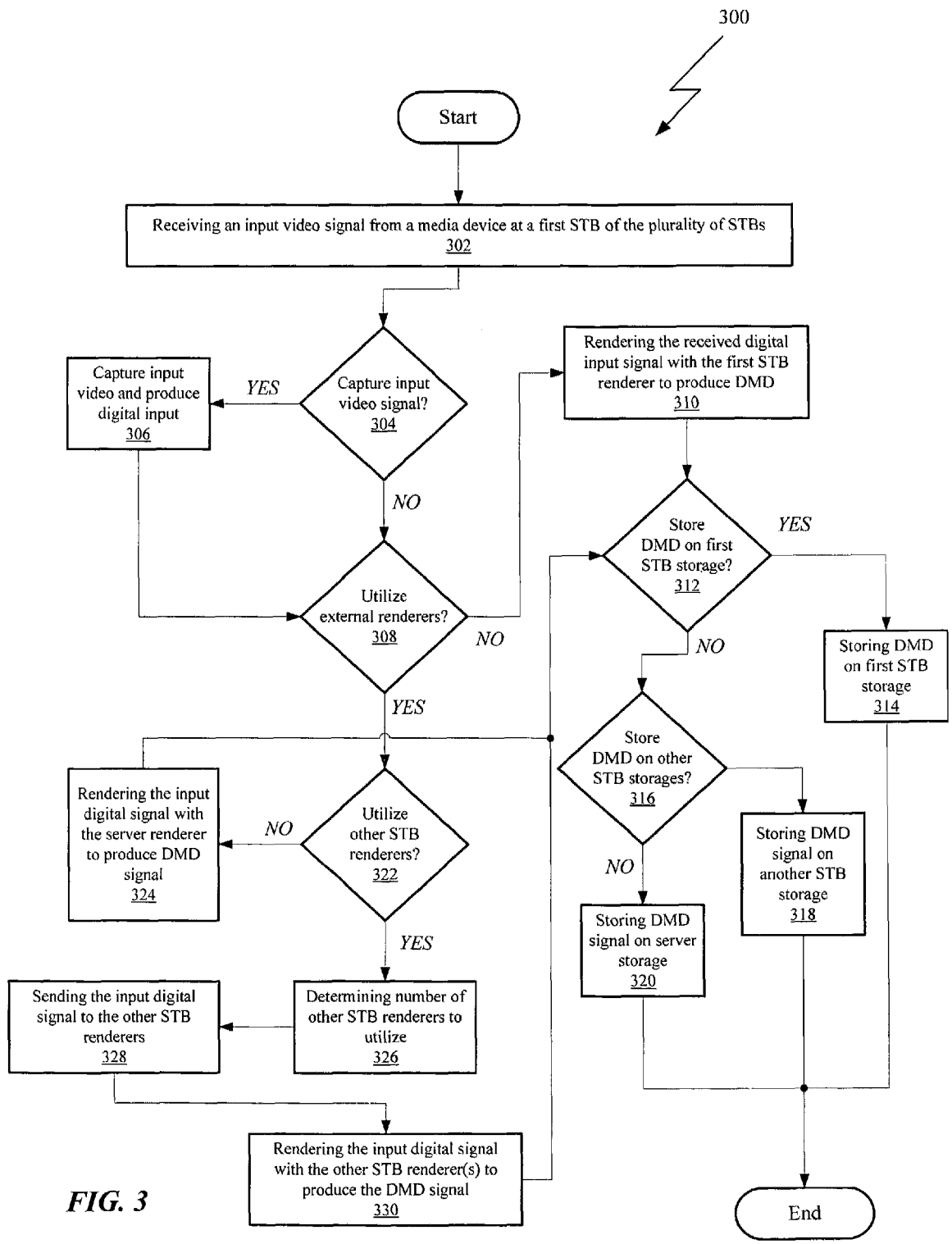
FIG. 3 shows a flow chart illustrating an example process performed by the DMSS described in FIGS. 1 and 2 in accordance with the disclosure.

FIG. 3 shows a flow chart 300 illustrating the example process performed by the DMSS described above in accordance with the disclosure. In general, the process starts, in step 302, by receiving an input video signal from a media device at the first STB of the plurality of STBs. The first STB then determines, in step 304, if the input video signal is in a digital format capable of being processed directly by the first STB or whether it needs to be captured with video capture so a to produce a digital input video signal capable of being processed directly by the first STB, server, or other STBs on the network. The input video signal may need to be captured if it is an analog video signal or is a digital video signal in a format that needs to be converted so as to be compatible with the first STB, server, or other STBs on the network. If the input video signal needs to be captured, the input video signal is capture to produce the digital input signal, in step 306. The process then determines, in step 308, whether to use the first renderer, an external renderer, or a combination of the first renderer and external renderers.

If the input video signal does not need to be captured, the input video signal is the digital input signal and the process continued to determination step 308. As stated earlier, the process then determines, in step 308, whether to use the first renderer, an external renderer, or a combination of the first renderer and external renderers.

If no external renderers are to be utilized the process continues to step 310. The first STB render then renders the digital input signal to produce the DMD signal. The process then continues to determination step 312, where the first STB determines whether the DMD signal is to be stored on the first STB storage or external storage. If it is determined that the DMD signal is to be stored on the first STB storage, the process continues to step 314, where the DMD signal is stored on the first STB storage, which may be either internal or external (such as, for example, connected via USB, HDMI, Firewire®, eSATA, IEEE 802.11, Bluetooth®, Ethernet, LAN, white space device, or other type of wired or wireless connection) to the first STB. The process then ends.

Alternatively, if it is determined that the DMD signal is not to be stored on the first STB storage, the process continues to determination step 316. In determination step 316, if the DMD signal is to be stored on another STB storage (such as, for example, the STB storage of another user that the first user desires to send the video to), the process continues to step 318, where the DMD signal is stored on the other STB storage. If, instead, it is determined that DMD signal is to be stored on the server storage, the process continues to step 320, where the DMD signal is stored on the server storage. The process then ends.

Returning to determination step 308, if external renderers are to be utilized the process continues to determination step 322. In determination step 322, if no other STB renderers are to be utilized, the process continues to step 324, where the input digital signal is rendered with the server renderer to produce the DMD signal. The process then continues to determination step 312, where the first STB determines whether the DMD signal is to be stored on the first STB storage or external storage. If it is determined that the DMD signal is to be stored on the first STB storage, the process continues to step 314, where the DMD signal is stored on the first STB storage, which may be either internal or external to the first STB. The process then ends.

Alternatively, if it is determined that the DMD signal is not to be stored on the first STB storage, the process continues to determination step 316. In determination step 316, if the DMD signal is to be stored on another STB storage (such as, for example, the STB storage of another user that the first user desires to send the video to), the process continues to step 318, where the DMD signal is stored on the other STB storage. If, instead, it is determined that DMD signal is to be stored on the server storage, the process continues to step 320, where the DMD signal is stored on the server storage. The process then ends.

Returning to determination step 322, if another STB renderer is to be utilized, the process continues to step 326. In step 326, the number of other STB renderers are determined and their identification and locations on the network are determined. In step 328, the input digital signal is send to the other STB renders. The input digital signal is then rendered utilizing the one of more of the other STB renders to produce the DMD signal. The process then continues to determination step 312, where the first STB determines whether the DMD signal is to be stored on the first STB storage or external storage. If it is determined that the DMD signal is to be stored on the first STB storage, the process continues to step 314, where the DMD signal is stored on the first STB storage, which may be either internal or external to the first STB. The process then ends.

Alternatively, if it is determined that the DMD signal is not to be stored on the first STB storage, the process continues to determination step 316. In determination step 316, if the DMD signal is to be stored on another STB storage (such as, for example, the STB storage of another user that the first user desires to send the video to), the process continues to step 318, where the DMD signal is stored on the other STB storage. If, instead, it is determined that DMD signal is to be stored on the server storage, the process continues to step 320, where the DMD signal is stored on the server storage. The process then ends.

Sharing Digital Media Data

Figure 4:
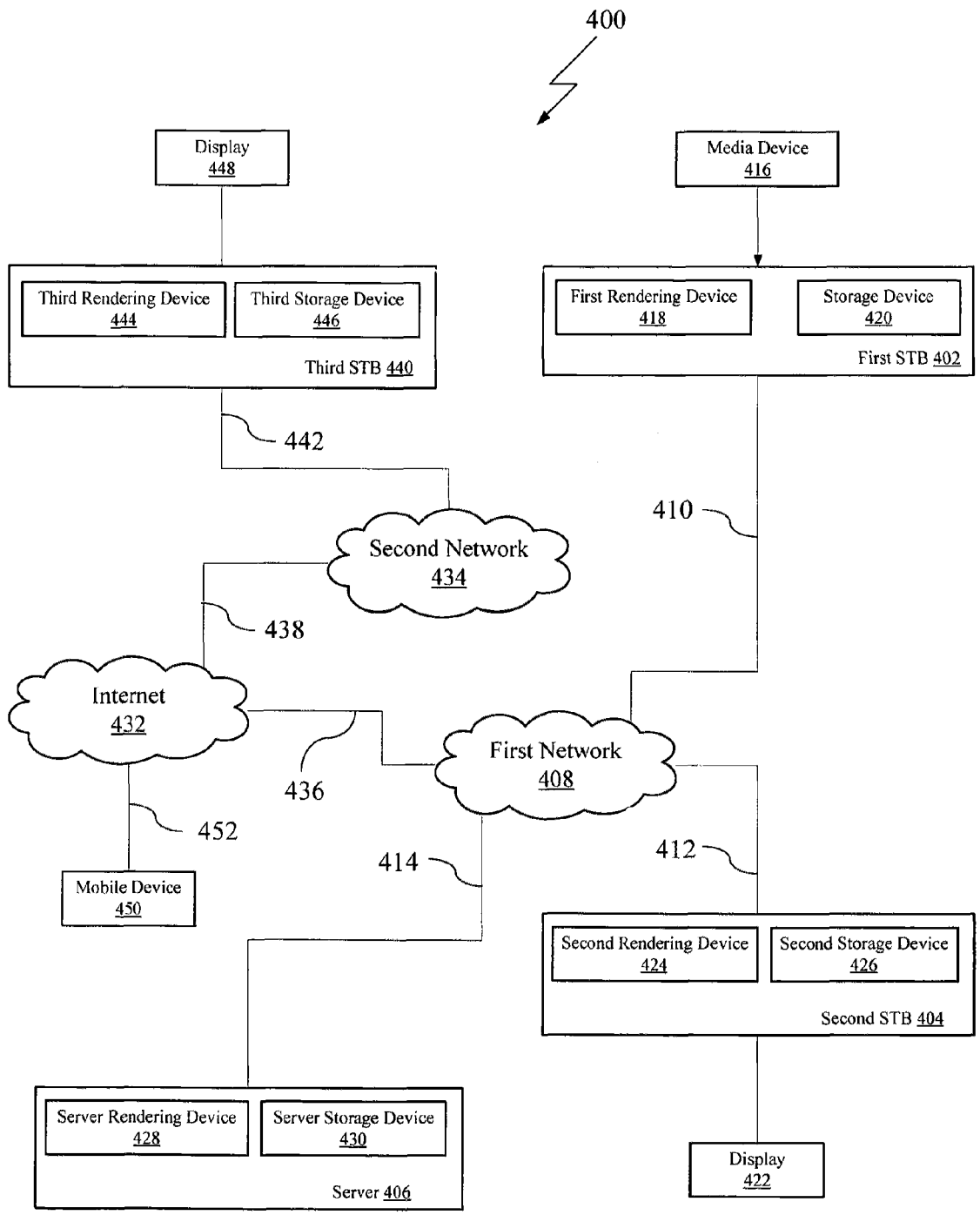
FIG. 4 shows a block diagram of an example of an implementation of DMSS to share DMD between STBs, mobile devices, and archives in accordance with the disclosure.
Figure 5:
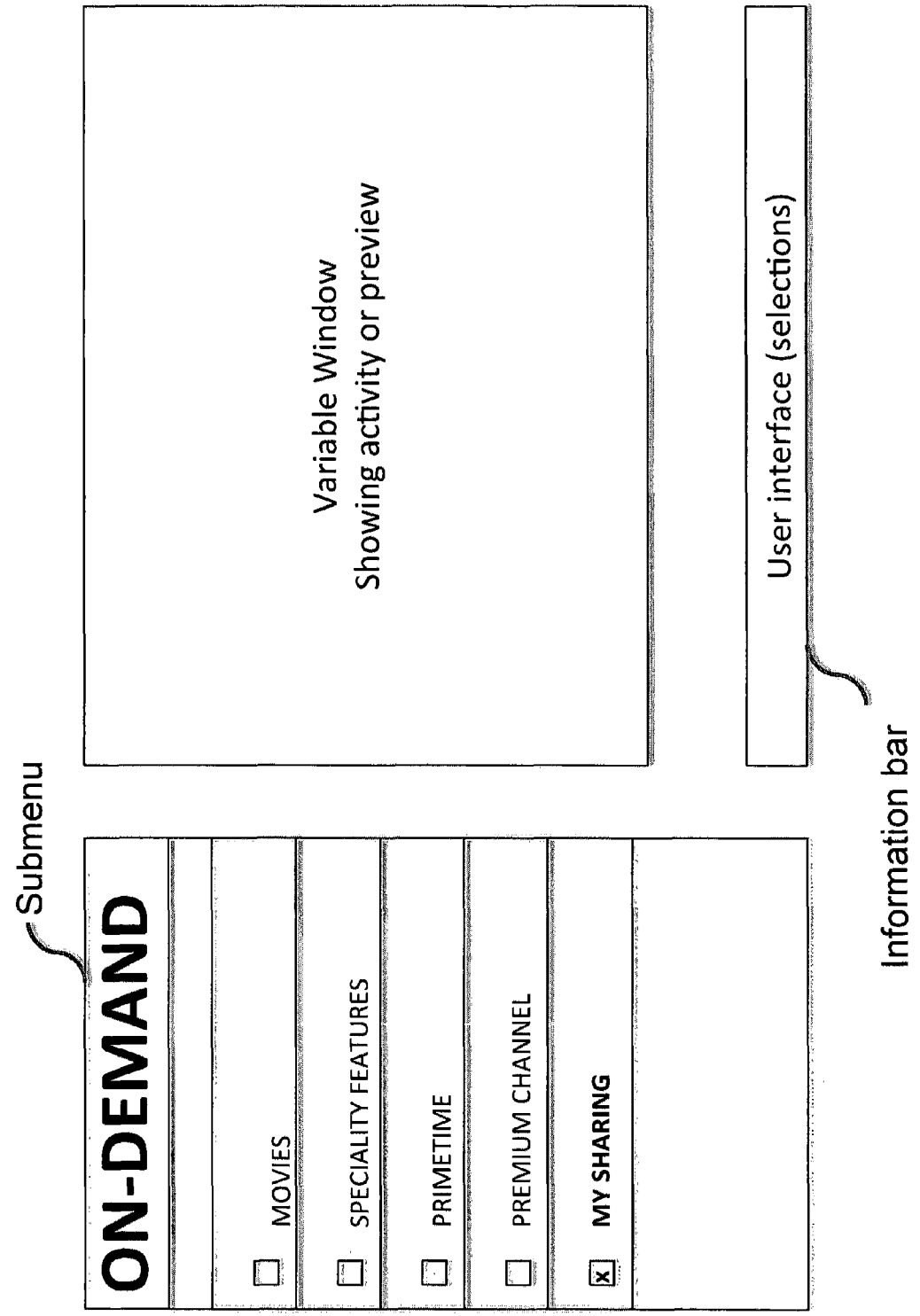
Figure 6:
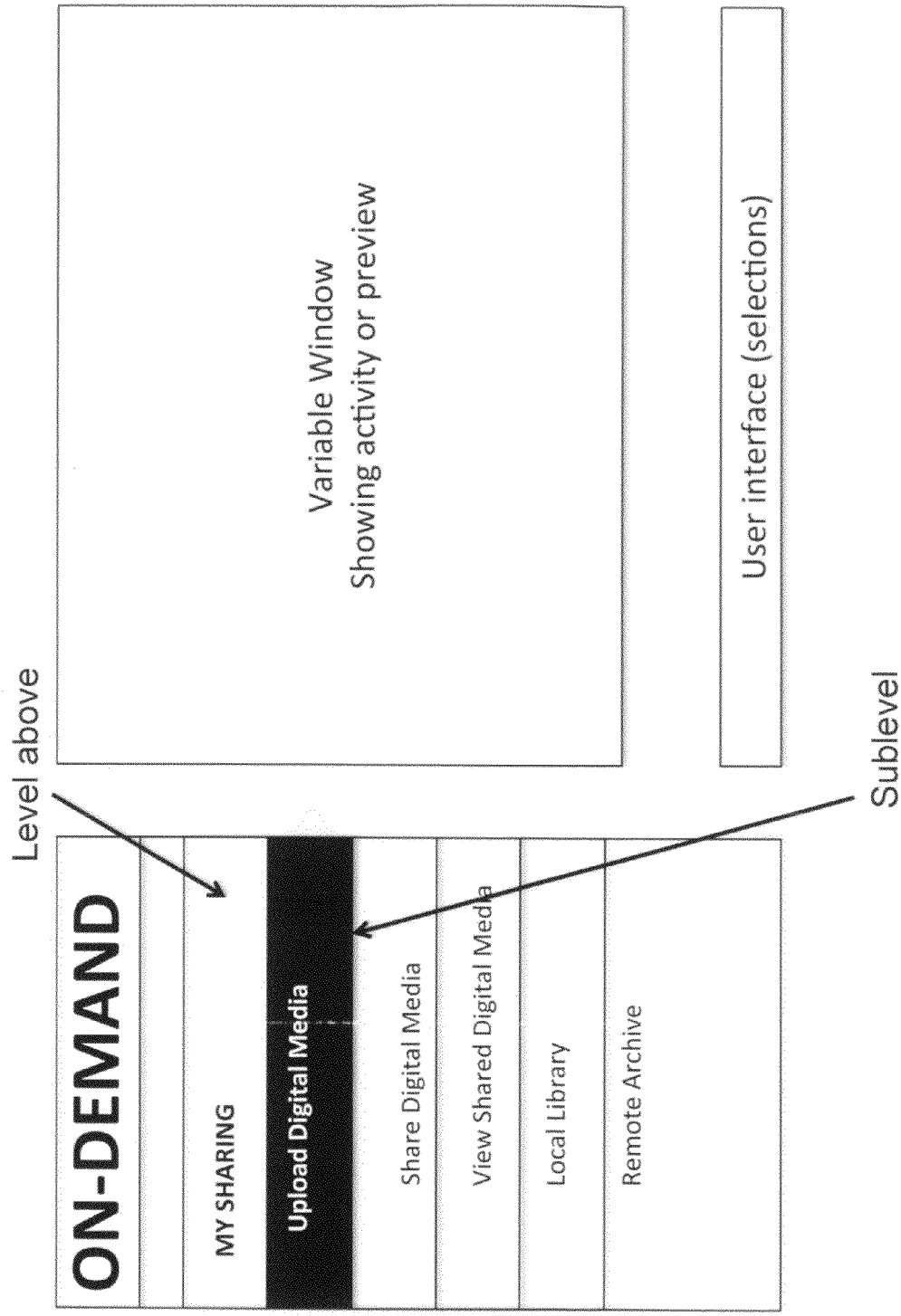
Figure 7:
Figure 8:
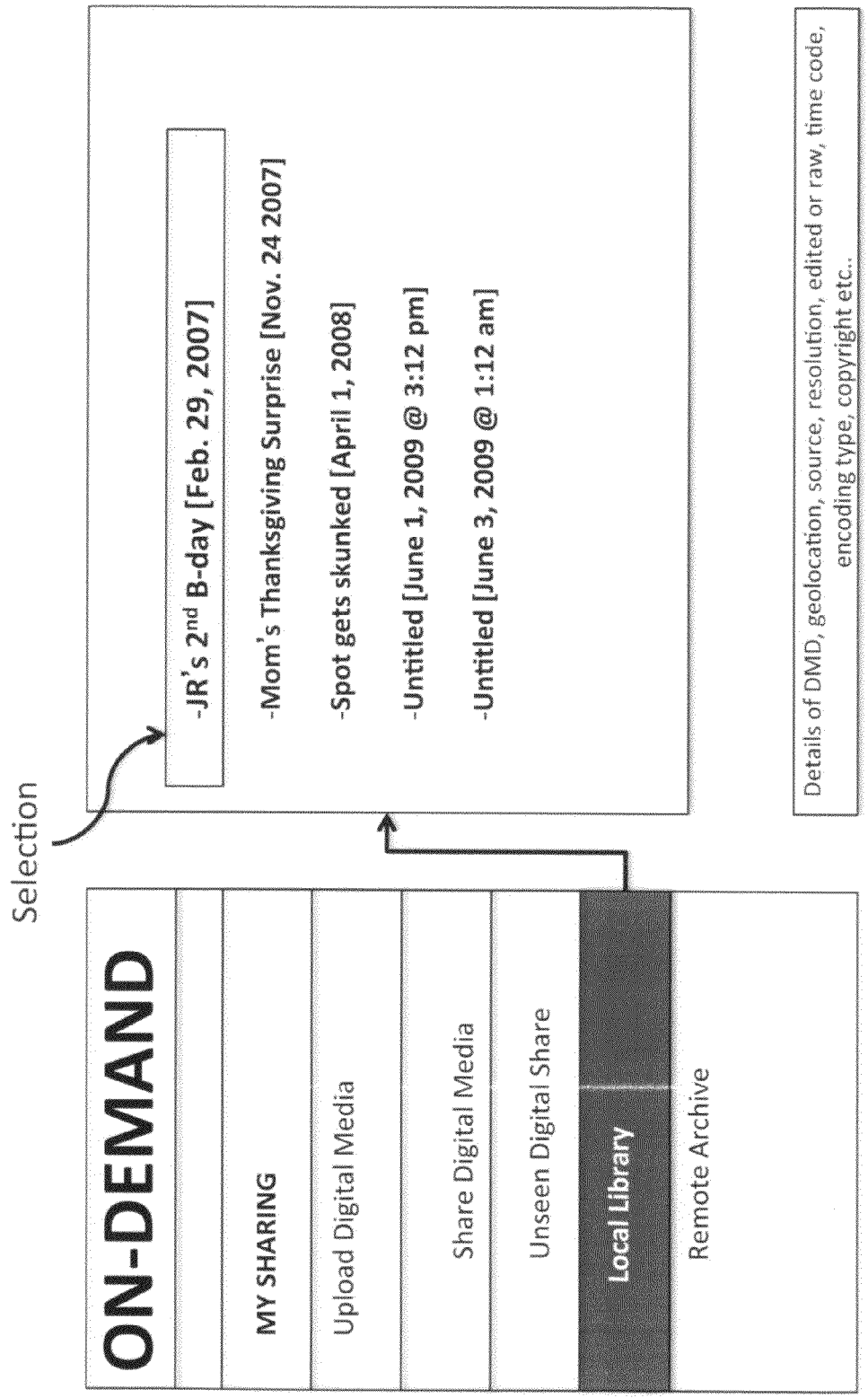
Figure 9:
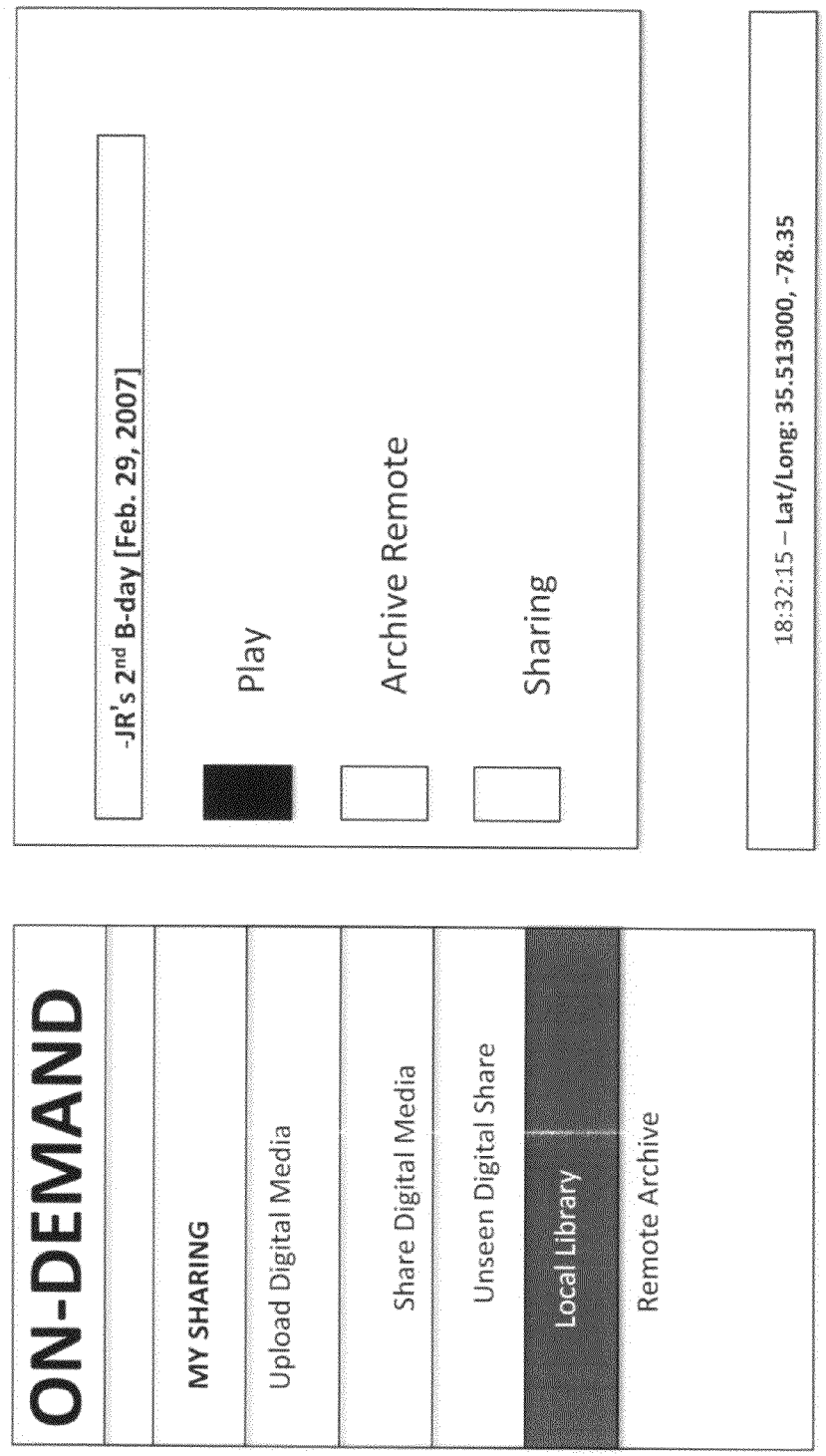
Figure 10:
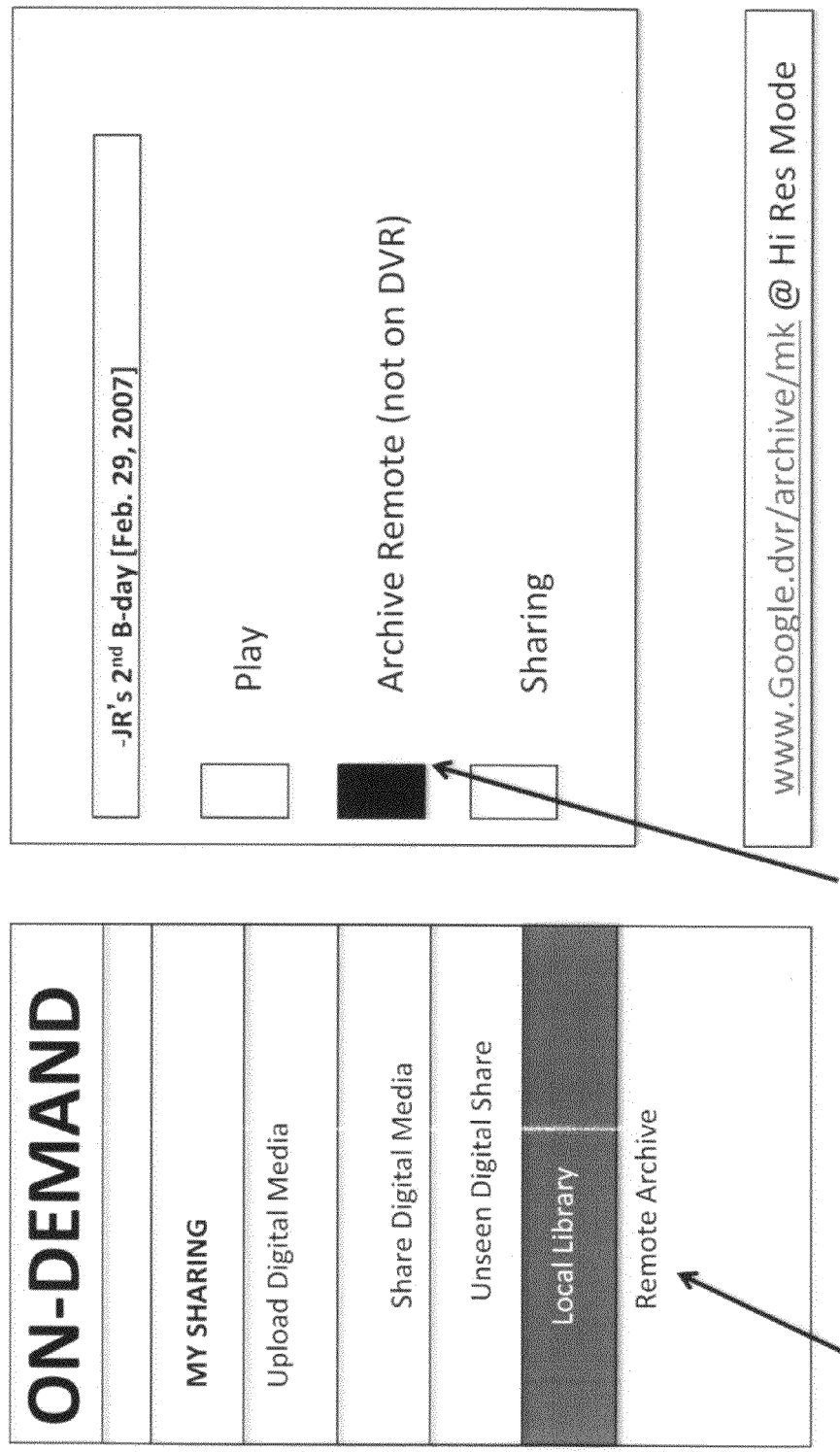
Figure 11:
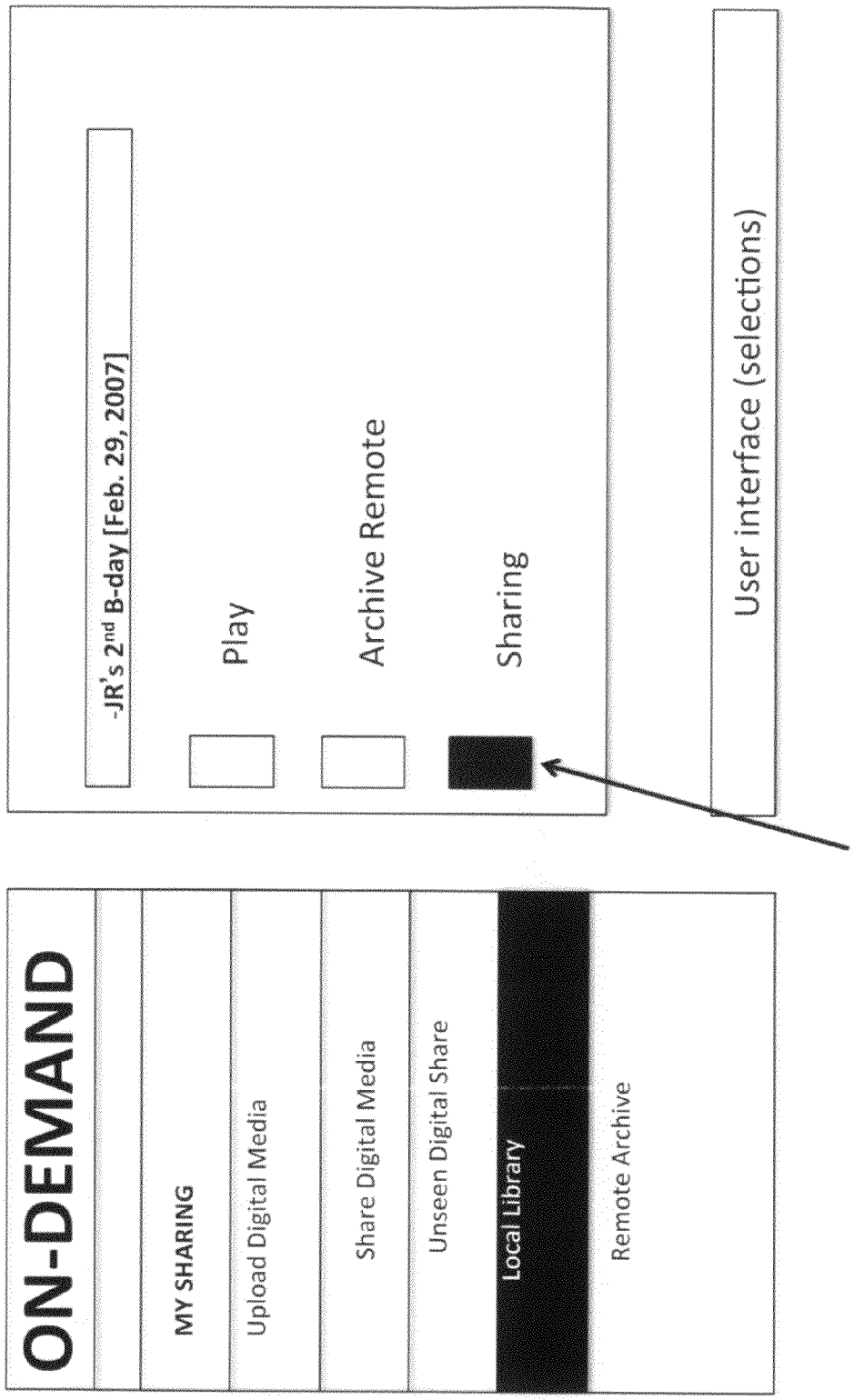
Figure 13:
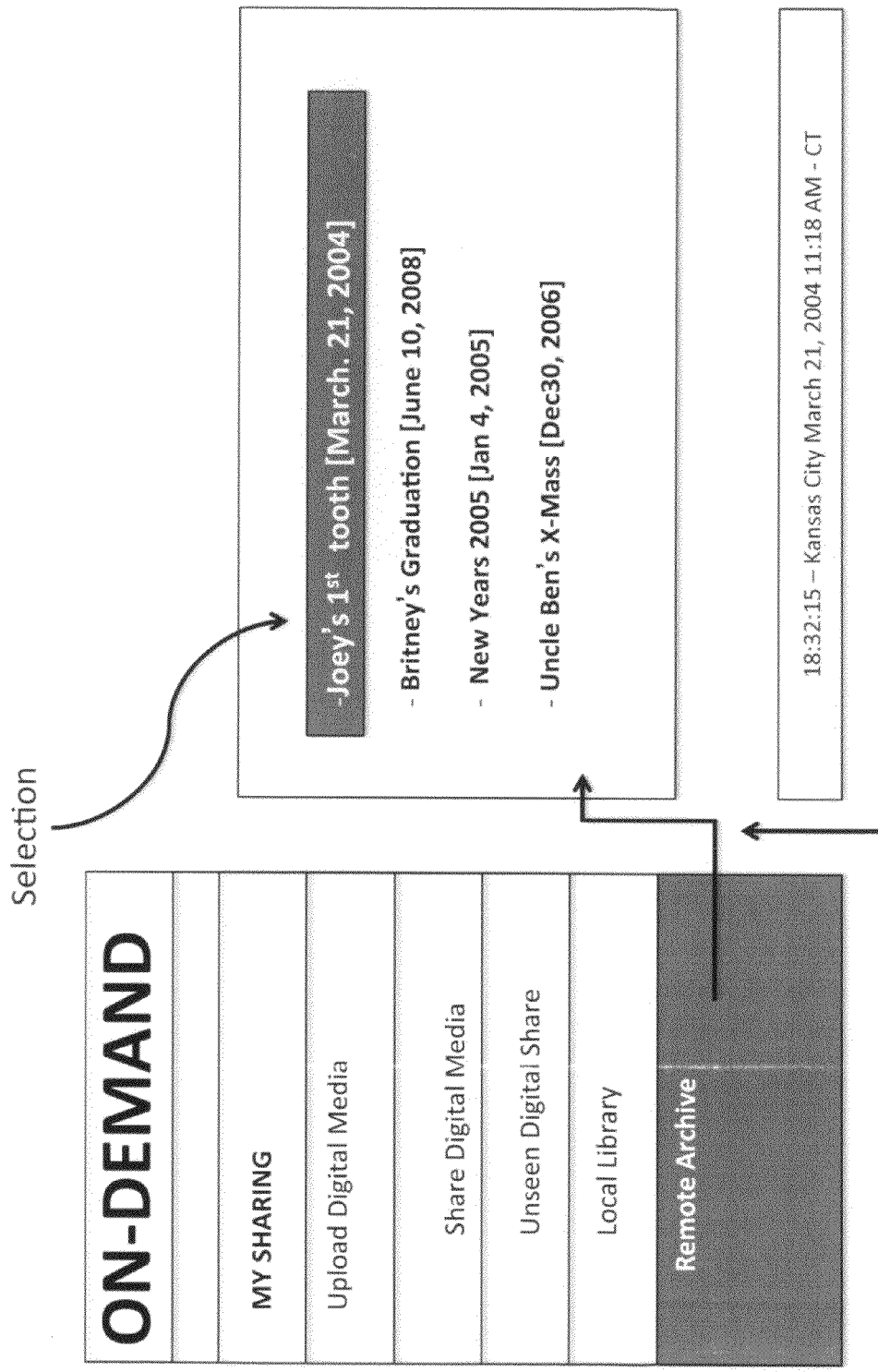
Figure 14:
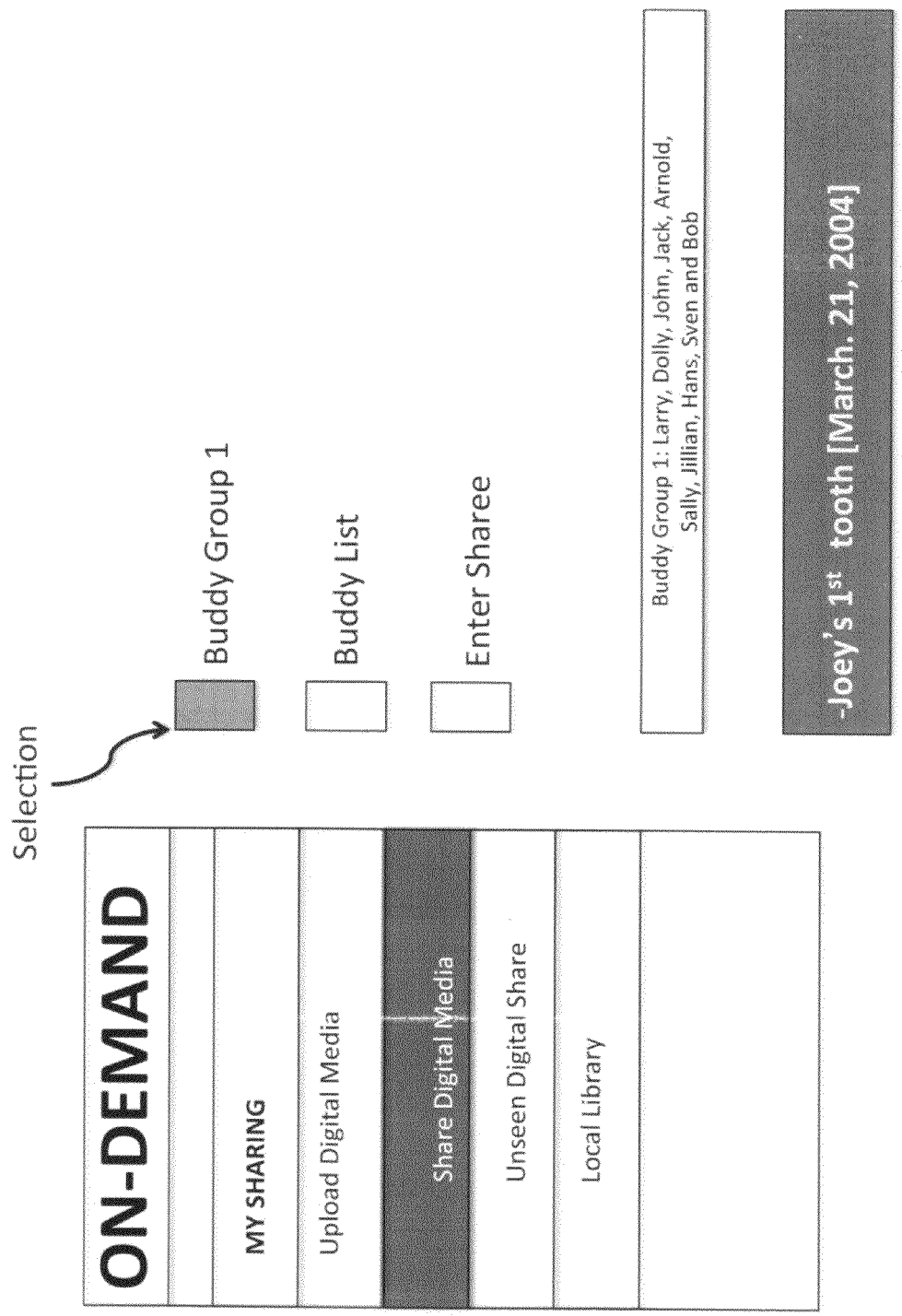
Figure 15:
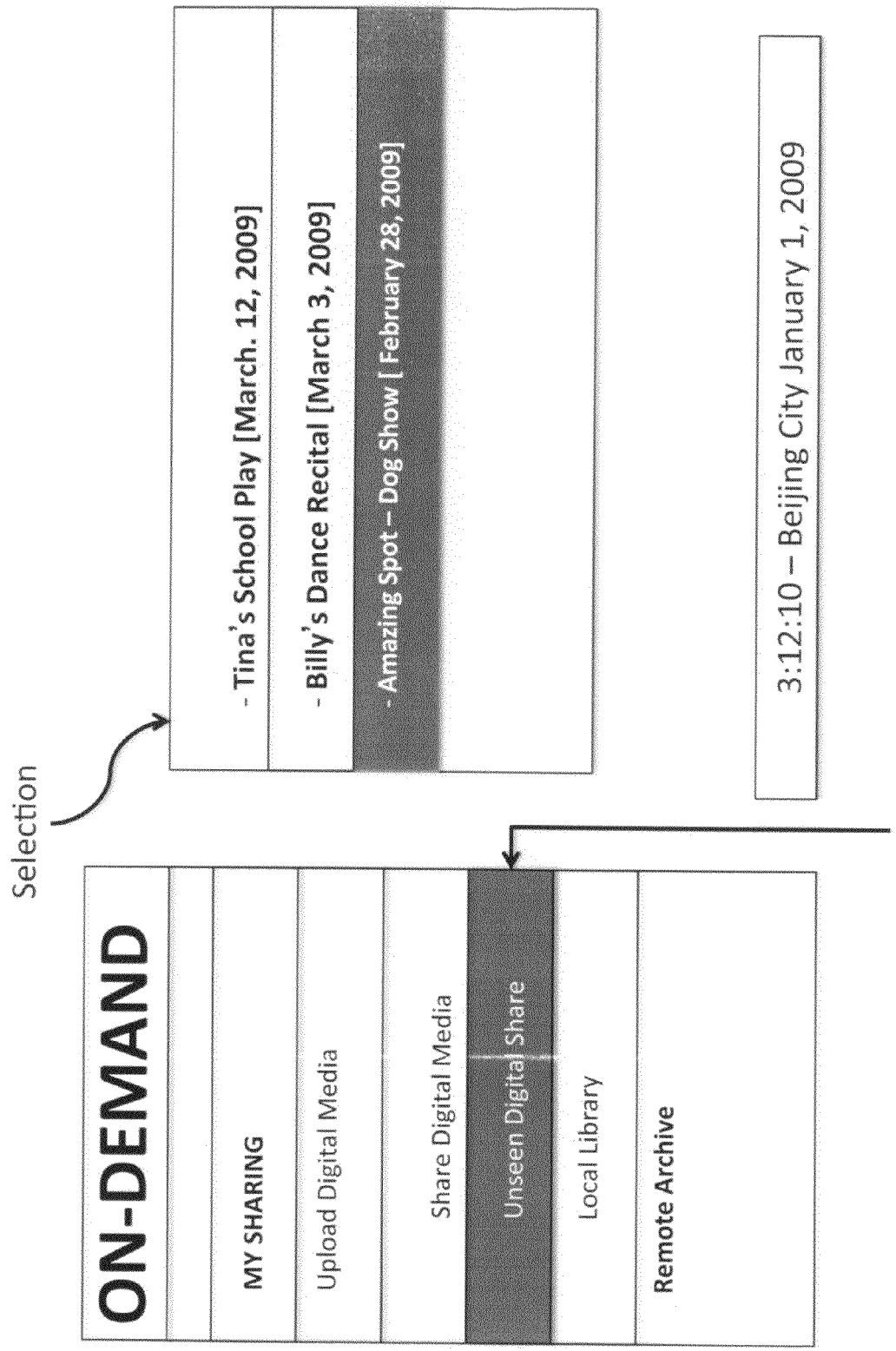
Figure 16:
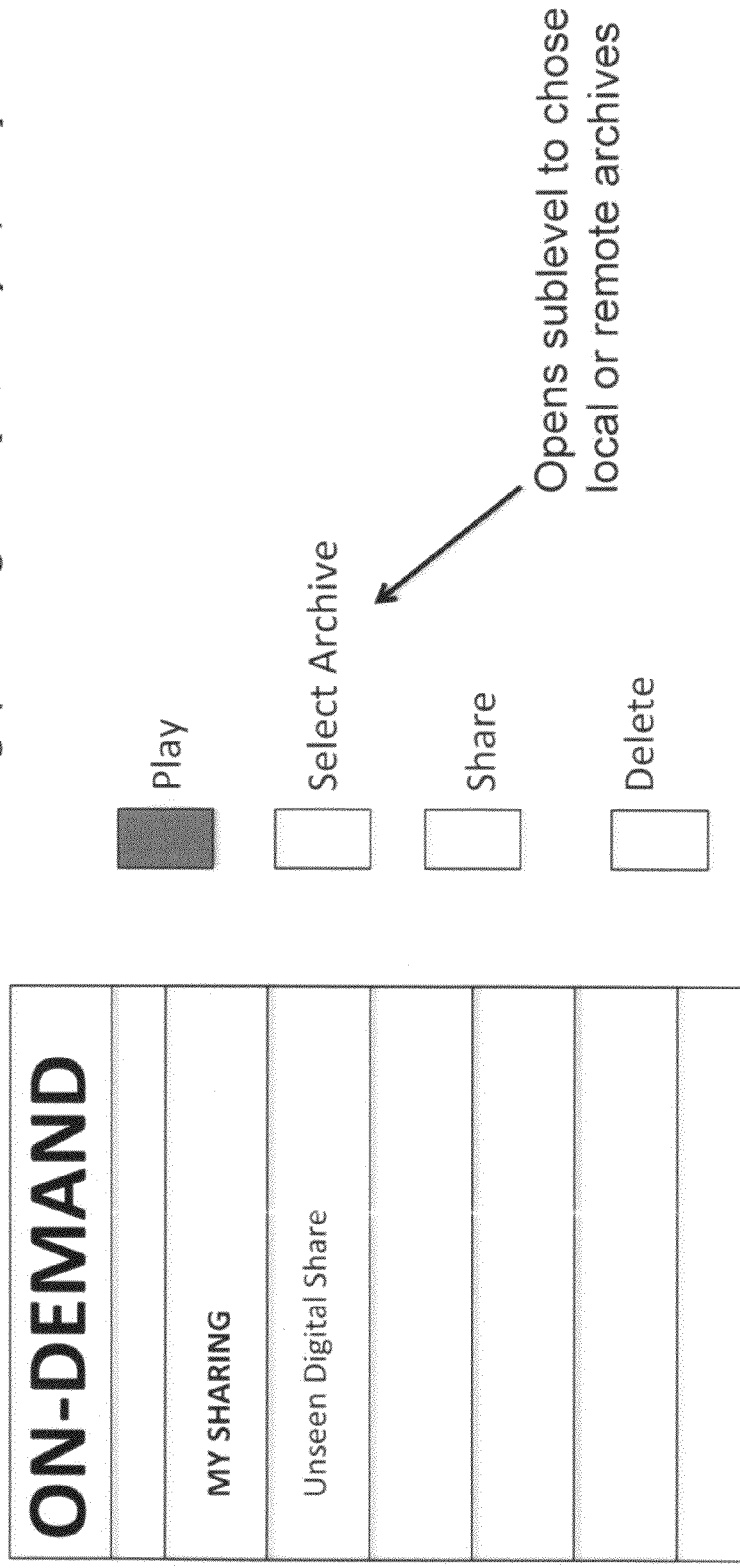

Turning back to FIG. 2, the DMSS 200 allows sharing of DMD between different users (each having a corresponding STB) in the network 104. The users and their corresponding STBs may act as peers in a peer-to-peer network. FIG. 4 shows a block diagram of an example of an implementation of DMSS 400 to share DMD between STBs, mobile devices, and archives in accordance with the disclosure. In this example, the DMSS 400 includes a first STB 402, second STB 404, server 406, and first network 408. The first STB 402, second STB 404, and server 406 may be in signal communication with the first network 408 via signal paths 410, 412, and 414, respectively. The first STB 402 may be in signal communication with a media device 416 (such as, for example, a video camera, mobile device with a built-in video camera, or other type of device) and may include a first renderer 418 and first storage device 420. Similarly, the second STB 404 may be in signal communication with a display device 422 (such as, for example, a television, video monitor, computer monitor, or other type of video device) and may include a second renderer 424 and second storage device 426. The server 406 may include a server renderer 428 and a server storage device 430. It is appreciated that while on a first STB 402 and second STB 404 are shown for illustration purposes, the first network 408 may have any plurality of STBs (not shown) in signal communication with the first network 408.

Sharing Digital Media Data within the Network

Within the first network 408, the STBs may share DMD. Specifically, a first user at the first STB 402 may share DMD on the first STB 402 with a second user at the second STB 404. As described above, the first user may capture video from the media device 416 at the first STB 402, which is processed to generate the DMD. Again as described above, the processing of the DMD may be accomplished by optionally utilizing the first renderer 418, the second renderer 424, the server renderer 428, other renderers (not shown) in other STBs (not shown) in signal communication with the first network 408, or any combination of these in parallel. Additionally, the DMD may be stored at the first storage device 420 and/or the server storage device 430.

The first user may allow the second user through the second STB 404 to have access to the DMD stored on the first storage device 420 and/or server storage device 430, which may then be displayed on the display device 422. The first user may also allow other STBs (not shown) on the first network 408 to also access the same DMD or other DMD, i.e., if the DMD includes multiple video clips, the first user may establish rules that allow the second STB 404 to access certain video clips, while establishing different rules for other STBs to access other video clips. These rules can establish "buddy lists" that allow certain "buddies" (i.e., certain STBs) to access certain DMD while other buddies access different DMD.

Sharing Digital Media Data Outside the Network

The STBs may also share DMD outside the first network 408. Specifically, the STBs may also share DMD to mobile devices external to the first network 408 and/or to STBs on other networks. As an example, the first network 408 may be in signal communication with the Internet 432 and a second network 434 through the Internet 432 and signal paths 436 and 438, respectively.

As an example, a first user at the first STB 402 may share DMD on the first STB 402 with a third user at a third STB 440. The third STB 440 may be in signal communication with the second network 434 via signal path 442 and may include a third renderer 444 and third storage device 446. The third STB 440 may also be in signal communication with a display device 448 to view the DMD. The second network 434 may be, for example, a second cable provider network. As an example, the first network 408 may be a Comcast cable network and the second network may be a Time Warner cable network.

As described above, the first user may capture video from the media device 416 at the first STB 402, which is processed to generate the DMD. Again as described above, the processing of the DMD may be accomplished by optionally utilizing the first renderer 418, the second renderer 424, the server renderer 428, other renderers (not shown) in other STBs (not shown) in signal communication with the first network 408, or any combination of these in parallel. Additionally, the DMD may be stored at the first storage device 420 and/or the server storage device 430.

The first user may allow the third user, through the third STB 440, to have access to the DMD stored on the first storage device 420 and/or server storage device 430, which may then be displayed on the display device 448. The first user may also allow other STBs (not shown) on the second network 434 to also access the same DMD or other DMD using buddy lists.

As another example, the first user at the first STB 402 may share DMD on the first STB 402 with a fourth user at a mobile device 450. The mobile device 450 may be in signal communication with the Internet 432 via signal path 452. The mobile device 450 may be an Internet 432 communication device having either wired or wireless connections to the Internet 432. The mobile device 450 may be, for example, an 802.11 enabled IPOD® (produced by Apple Inc.) device or other similar type of video device. Additionally, the mobile device 450 may be cellular mobile device such as a cellular telephone with video capability. If the mobile device 450 is a cellular mobile device, the signal path 452 may include a cellular network (not shown) that communicates between the mobile device 450 and the Internet 432.

Again, as described above, the first user may capture video from the media device 416 at the first STB 402, which is processed to generate the DMD. The processing of the DMD may be accomplished by optionally utilizing the first renderer 418, the second renderer 424, the server renderer 428, other renderers (not shown) in other STBs (not shown) in signal communication with the first network 408, or any combination of these in parallel. Additionally, the DMD may be stored at the first storage device 420 and/or the server storage device 430.

The first user may allow the fourth user, through the mobile device 450, to have access to the DMD stored on the first storage device 420 and/or server storage device 430, which may then be displayed on the mobile device 450. The first user may also allow other mobile devices (not shown) to also access the same DMD or other DMD using buddy lists.

Peer-to-Peer Buddy Lists

In general, a cable provider of the first network 408 maintains a domain name server on the first network 408, which may be the server 406 or another server (not shown). All the STBs on the first network 408 have machine access control ("MAC") addresses, where each MAC address is a unique identifier assigned a specific STB that is used in the media access control protocol sub-layer. A new pathway to provide a more secure peer-to-peer transfer of shared DMD is a MACNS which links a MAC address to the domain name server ("MACNS") this is a form of identity information. Generally, a domain name server is not truly secure and uses layer of software (variable) and identifiers such as the user name and/or password to authenticate. A MACNS uses multiple layers to secure that "sharee" STB and "sharer" STB (i.e., the peer 1 and peer 2) are in fact the parties whom believe each other are communicating with.

A third level of ID number or password may be layered over the MACNS as an option and this can be another form of identity information. Because cable providers may also maintain a Peer subscriber's current Internet protocol ("IP") address (which can be dynamic), the MACNS may require filtering through the cable provider servers to update any IP address change.

Registering STB to Global Buddy List

A Peer signs on to register themselves to a Buddy list. Part of registration includes the inclusion of the peer's STB MAC address in a database managed by a third party such as a cable provider, a gaming system manufacture, a service provider such as Facebook Inc., Google Inc., Apple Inc. Myspace LLC of Beverly Hills, Calif., Netflix Inc. of Los Gatos, Calif., or AOL Inc. of New York City, New York. The database manager has a record of its subscribers MAC addresses and knows the DNS/IP address thereby forming the MACNS for Peer 1. The peer registration may include at least one of a "Handle" (aka a nickname), peer's actual name, billing telephone number and zip code for their STB service or system, provider name, receiver ID, cablecard id, access ID, STB serial number, etc.

Peer 1 may create a Buddy list (that includes other peers) that Peer 1 is authorizing for sharing and there may be degrees of authorization linked to different Buddies on the list (i.e. size of shared files, frequency, whether the file is automatically archived). Once a peer account is created, a peer-name and/or password may be provided and/or created to give Peer 1 remote access to the buddy lists.

Finding a Buddy

In some exemplary implementation wherein the service provider is a cable provider (as opposed to MYSPACE® NETFLIX®, or AOL®, FACEBOOK®, GOOGLE®, APPLE®, or the like). Peer 1 (the sharer) wants to share with a specific Buddy (Peer 2) but Buddy is not already one of Peer 1's Buddies. Peer 1 is prompted by an STB menu to enter certain data criteria to identify Buddy (Peer 2). This may include any account registration information such as that type Peer 1 provided a CTP to create a peer's account.

The cable provider then takes the data provided by Peer 1 and conveys the data about Buddy (Peer 2) to Buddy's STB. Buddy's STB determines if Peer 1 has share rights to Buddy (Peer 2). If not the STB for Buddy notifies Buddy and requests authorization for Peer 1. If the STB for Buddy cannot authorize Peer 1 then no share. Otherwise sharing is supported. If Peer 1 is approved then STB for Buddy provides STB for Peer 1 Buddy's complete MACNS plus Buddy's active IP address.

Once Buddy is found, all relevant data is stored locally, including Buddy name, MACNS address for future authentication and current IP address (queried later to ensure validity, as IP addresses tend to be start by nature) when wanting to receive/transmit digital media. Once a Buddy is approved, Buddy's STB is authenticated and direct sharing from Peer 1 to Peer 2 at whatever approved level can commence.

Managing Buddies and Lists

Buddy lists are listed by Peer 1, Peer 1 may add a preferred identifier. The following example is a non-exclusive list of some examples of such identifiers: age, location, attribute (female, male grandparent, siblings) image, group affiliation, nickname or full user name. Buddy lists can also be configured into groups or types of Buddies, depending on relationships.

Optionally, Peer 1 is able to set preferences to each Buddy individually vs. global settings. These specific preferences include, but not limited to:

File size—limit the amount of file size a Buddy can send per file. If file size is too large due to preferences, or exceeds available space the option to send a re-sized copy is optional.

File type—limit the typed of video codes acceptable (WM, MOV, H.264, Xvid, mpeg1, mpeg2, DV-AVI, Divx, MKV, and other known file formats and containers, including the native DVR file formats. Frequency how often per period a buddy can send Peer 1 DMD.

Content, files may be prescreened by Peer 1's STB (which may be at least one of cablebox, gaming system, gaming unit, PLAYSTATION®, NINTENDO®, WII®, XBOX®, APPLE TV®, DVR, and the like) and files with questionable content (beyond a rating level i.e. family, teen, adult) may be refused or quarantined. Buddy if so chosen via preferences can be given direct, point to point access to both local STB content and/or to remote storage to view available content, including publically available video or private content determined by preferences relevant to the Buddy.

Shown in FIGS. 5 through 16 are example screen shots of a graphical user interface (GUI) to some aspects of the disclosure. All callouts in these figures are hereby incorporated as if fully set forth herein.

Shown in FIGS. 17-19 are exemplary implementations of identifying the ends of a DMD file (500) which has ends forming a start boundary (502) and a stop boundary (504). On aspect of this disclosure is the use of a shared DMD file to act as a vehicle, Trojan horse, canvas or piggy back for one of a brand, message and advertisement file which may be referred to as Message Media or "MM". Examples of MM that may be connected or embedded to a DMD file include but are not limited to sound, video, still image, video game, service, product, TV or movie trailer. FIG. 18 illustrates one or more MM files (600, 650) each with a start (602,652) and a stop (604, 654) connected a DMD file (500). MM files may be one or more and they may be contiguous, or separate. MM files may attach at either end of the DMD file. Those of ordinary skill in the art will also understand that an MM file may also be inserted in the midst of the to share DMD and such is within the scope of this disclosure. When a DMD file is targeted to be a carrier of a MM file it may also be identified as a Target DMD file or TDMD as it is targeted by the advertiser or other seeking to piggy back or add content to the share DMD.

The insertion of MM to a share DMD may be automatic, via proxy or on a case by case basis. The insertion may be surrounded by prompts communicated to the sharer and may also ask for or require sharer's acceptance of adding a MM file. Alternatively as a promotion method a sponsor who may also defray costs of digital sharing of personal media could exchange agreement to have or to accept MM inserted in a share DMD in exchange for reduced costs, or accumulation of benefits when using the DMD sharing system. A revenue model associated with MM add-ons includes charging a fee to advertisers for the addition of the MM to the share file.

Said MM content may come from a plethora of sources. It may be reside at the server side or the local side. The MM may be uploaded to the local STB (which may be at least one of cablebox, gaming system, gaming unit, PLAYSTATION®, NINTENDO®, WII®, XBOX®, APPLE TV®, DVR, and the like) at either the sharee or sharer side and may be added to a DMD file before a share, during preparation for a share (thereby excluding an archive), prior to archive, on the receipt side of the sharee or during the playback preparation. Such content may be general for example a version of a product advertisement for television/broadcast. Such content may be narrowly item specific including but not limited to new movies, sporting events, sales, other events. Such content may be geographic specific based on the location of the likely viewer (buddy). Such content may be date or time specific. Note, a user or buddy may optionally have the choice via the interface to archive or to not archive the MM associated with the share DMD.

In FIG. 19 rather than physically adding the MM at the to share DMD file, a time gap (700) or allocation is identified with specified start (702) and stop (704) codes. Said gap is of a defined period i.e. 10 seconds, 20 seconds, 35 seconds . . . n seconds. The gap identifies an opportunity to insert MM. Utilizing said gap as opposed to locking down a particular content for the MM provides a platform that can draw from the user or buddy side and or local host. The gap offers the opportunity to insert very current, very local or very targeted MM content which may have a higher probability to being the type of content the recipient would resonate with. Said MM content filling the time gap would reside at the server side or on the local side of the sharee.

Figure 22:
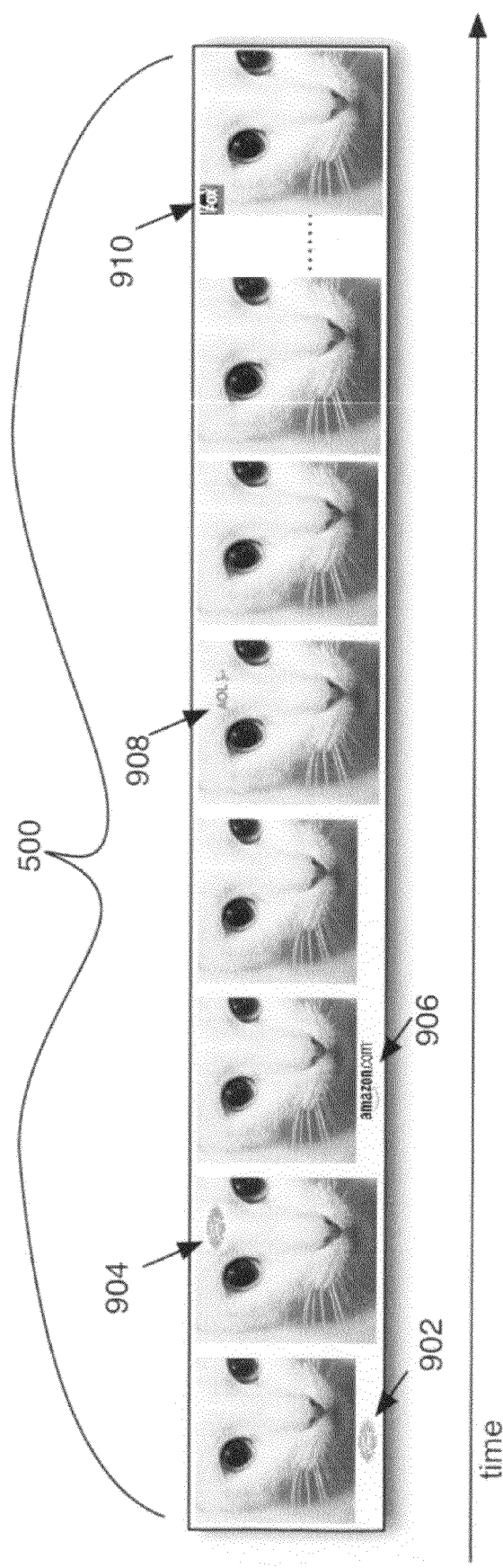

FIGS. 20-22 illustrate some aspects of one exemplary implementation to overlay a MM onto at least a portion of the DMD file (500). In addition to regular MM, said overlay MM (800) may include logos or what is known by the those in the art as "bugs" which may be added over the DMD file solid or partially transparent.

FIGS. 21 and 22 are illustrative of a portion of a frame by frame overlay of MM. Frame 1 (510) is a platform for a first overlay (902). The second frame (520) is a platform for a second overlay (904). The third frame (530) is a platform for a third overlay (906). The fourth frame (540) is a platform for a fourth overlay (908). The fifth frame (550) is without overlay. The sixth frame (560) is a platform for a fifth overlay (910).

All callouts in all figures are incorporated by this reference as if fully set forth herein.

While the method and agent have been described in terms of what are presently considered to be the most practical implementations and aspects thereof, it is to be understood that the disclosure need not be limited to the disclosed implementations, aspects or order and/or sequence of combination of aspects. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the implementation, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting, such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternatives.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps. Such terms should be interpreted in their most expansive forms so as to afford the applicant the broadest coverage legally permissible. All callouts associated with figures are hereby incorporated by this reference.

Since certain changes may be made in the above system, method, process and or apparatus without departing from the scope of the disclosure herein involved, it is intended that all matter contained in the above description, as shown in the accompanying drawing, shall be interpreted in an illustrative, and not a limiting sense.

While various embodiments of the disclosure have been described, it will be apparent to those of ordinary skill in the art that many more embodiments and implementations are possible within the scope of this disclosure. Moreover, it will be understood that the foregoing description of numerous implementations has been presented for purposes of illustration and description. It is not exhaustive and does not limit the claimed disclosures to the precise forms disclosed. Modifications and variations are possible in light of the above description or may be acquired from practicing the disclosure. The claims and their equivalents define the scope of the disclosure. Accordingly, the disclosure is not to be restricted except in light of the attached claims and their equivalents.

What is claimed is:

1. A digital media sharing system ("DMSS"), the DMSS comprising:
    a proprietary network;
    a first set-top box ("STB") in signal communication with the proprietary network,
        wherein the first STB is configured to receive a video signal from a media device,
        wherein the media device is a detachable device,
        wherein the first STB is in signal communication with a first rendering device,
        wherein the first rendering device is configured to render the received video signal to produce a digital media data ("DMD"), and
        wherein the first STB is a sharer;
    a second STB in signal communication with the proprietary network,
        wherein the second STB is configured to receive the DMD, and
        wherein the second STB is a sharee; and
    a storage device in signal communication with the first STB, second STB, and proprietary network,
    wherein the storage device is configured to store the rendered DMD,
    wherein the proprietary network includes a cable television provider ("CTP") network, satellite television provider ("STP") network,
    wherein the DMD is combined with a Message Media ("MM") file, and
    wherein the combined DMD and MM file is transmitted to the second STB.

2. The DMSS of claim 1,
    wherein the DMD is a target DMD file ("TDMD"),
    wherein the TDMD is combined with a MM file, and
    wherein the combined TDMD and MM file is transmitted to the second STB.

3. The DMSS of claim 1, wherein the first STB is selected from the group consisting of a cablebox, gaming system, gaming unit, digital media player, and DVR.

4. The DMSS of claim 3, wherein the MM file is combined to the DMD before a start boundary of the DMD or after a stop boundary of the DMD.

5. The DMSS of claim 3, wherein the MM file is combined to the DMD between a start boundary of the DMD and a stop boundary of the DMD.

6. The DMSS of claim 3, wherein prior to combining the MM file with the DMD, the MM file resides on the first STB, second STB, or a server remote from the first STB.

7. The DMSS of claim 3, wherein prior to combining the MM file with the DMD, a prompt or acceptance, or both, is displayed to a user of the first STB.

8. The DMSS of claim 3, wherein prior to combining the MM file with the DMD, a prompt or acceptance, or both, is displayed to a user of the second STB.

9. The DMSS of claim 3,
    wherein prior to combining the MM file with the DMD, the MM file resides on the first STB, second STB, or a server remote from the first STB and
    wherein prior to combining the MM file with the DMD, a prompt or acceptance, or both, is displayed to a first user of the first STB or a second user of the second STB.

10. The DMSS of claim 1,
    wherein the DMD is a target DMD file ("TDMD"),
    wherein the TDMD is combined with a MM file,
    wherein the combined TDMD and MM file is transmitted to the second STB, and
    wherein the MM file is combined to the TDMD before a start boundary of the TDMD or after a stop boundary of the TDMD.

11. The DMSS of claim 10, wherein the MM file is combined to the TDMD before a start boundary of the TDMD or after a stop boundary of the TDMD.

12. The DMSS of claim 10, wherein the MM file is combined to the TDMD before a start boundary of the TDMD or after a stop boundary of the TDMD.

13. The DMSS of claim 10, wherein the MM file is combined to the TDMD between a start boundary of the TDMD and a stop boundary of the TDMD.

14. The DMSS of claim 10, wherein prior to combining the MM file with the TDMD, the MM file resides on the first STB, second STB, or a server remote from the first STB.

15. The DMSS of claim 10, wherein prior to combining the MM file with the TDMD, a prompt or acceptance, or both, is displayed to a user of the first STB.

16. The DMSS of claim 10, wherein prior to combining the MM file with the TDMD, a prompt or acceptance, or both, is displayed to a user of the second STB.

* * * * *